US007509443B2

(12) United States Patent
Matsuo et al.

(10) Patent No.: US 7,509,443 B2
(45) Date of Patent: Mar. 24, 2009

(54) STORAGE MANAGEMENT SYSTEM AND METHOD USING PERFORMANCE VALUES TO OBTAIN OPTIMAL INPUT/OUTPUT PATHS WITHIN A STORAGE NETWORK

(75) Inventors: Toshiaki Matsuo, Yokohama (JP); Takato Kusama, Kawasaki (JP); Tatsundo Aoshima, Yokohama (JP); Kei Takeda, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 298 days.

(21) Appl. No.: 11/254,803

(22) Filed: Oct. 21, 2005

(65) Prior Publication Data
US 2007/0061446 A1 Mar. 15, 2007

(30) Foreign Application Priority Data
Aug. 26, 2005 (JP) ............................. 2005-245528

(51) Int. Cl.
*G06F 12/00* (2006.01)
(52) U.S. Cl. .............................. 710/38; 711/111; 710/1; 710/15
(58) Field of Classification Search ................. 711/114, 711/170, 118, 151; 709/217, 224, 201; 707/10
See application file for complete search history.

(56) References Cited

U.S. PATENT DOCUMENTS

| | | | | |
|---|---|---|---|---|
| 6,732,104 B1 * | 5/2004 | Weber | ......................... | 707/10 |
| 6,748,489 B2 * | 6/2004 | Soejima et al. | ............. | 711/114 |
| 6,760,775 B1 * | 7/2004 | Anerousis et al. | ........... | 709/238 |
| 6,769,071 B1 * | 7/2004 | Cheng et al. | .................... | 714/4 |
| 6,895,472 B2 * | 5/2005 | Neiman et al. | .............. | 711/118 |
| 6,895,485 B1 * | 5/2005 | DeKoning et al. | .......... | 711/170 |
| 6,957,433 B2 * | 10/2005 | Umberger et al. | ........... | 718/103 |
| 7,143,008 B2 * | 11/2006 | Ochi et al. | .................. | 702/186 |
| 7,249,347 B2 * | 7/2007 | Chang et al. | ................ | 717/113 |
| 2003/0223428 A1 * | 12/2003 | Gonzalez et al. | ......... | 370/395.4 |

OTHER PUBLICATIONS

Hennessy et al., Computer Architecture, 2003, Morgan Kaufmann, pp. 650-651.*

* cited by examiner

*Primary Examiner*—Henry W. H. Tsai
*Assistant Examiner*—Cheng-Yuan Tseng
(74) *Attorney, Agent, or Firm*—Antonelli, Terry, Stout & Kraus, LLP

(57) ABSTRACT

A CPU of a performance management server, upon receipt of a request from a keyboard or a mouse to newly assign an application to a specified application server, acquires an I/O path between the requested application server and a storage subsystem combined with the application server from the configuration information managed by the internal database of the performance management server, and based on the performance information managed by the database in the performance management server, an I/O path having the performance information satisfying the designated conditions is extracted from the acquired I/O paths and displayed as a candidate path on a display unit.

13 Claims, 15 Drawing Sheets

FIG.4

SERVER-SIDE PORT PERFORMANCE INFORMATION 112

| SERVER NAME (700) | SERVER-SIDE PORT NAME (701) | SERVER-SIDE PORT TRANSFER RATE (702) | TIME POINT (703) |
|---|---|---|---|
| mercury | 1 | 6.2MB/s | 2005/06/28 14:00 |
| mercury | 2 | 5.6MB/s | 2005/06/28 14:00 |
| mercury | 3 | 2.3MB/s | 2005/06/28 14:00 |
| mercury | 1 | 4.5MB/s | 2005/06/28 15:00 |
|  | : |  | : |

FIG.5

STORAGE-SIDE PORT PERFORMANCE INFORMATION 212

| STORAGE SUBSYSTEM NAME (710) | STORAGE-SIDE PORT NAME (711) | STORAGE-SIDE PORT TRANSFER RATE (712) | TIME POINT (713) |
|---|---|---|---|
| #9876 | 1 | 2.3MB/s | 2005/06/28 14:00 |
| #9876 | 2 | 4.2MB/s | 2005/06/28 14:00 |
| #9876 | 3 | 1.7MB/s | 2005/06/28 14:00 |
| #9876 | 1 | 2.1MB/s | 2005/06/28 15:00 |
|  | : |  | : |

FIG.6

ARRAY GROUP PERFORMANCE INFORMATION 213

| STORAGE SUBSYSTEM NAME | ARRAY GROUP NAME | ARRAY GROUP RESPONSE TIME | TIME POINT |
|---|---|---|---|
| #9876 | 1 | 7.6ms | 2005/06/28 14:00 |
| #9876 | 2 | 2.2ms | 2005/06/28 14:00 |
| #9876 | 3 | 4.2ms | 2005/06/28 14:00 |
| #9876 | 1 | 4.5ms | 2005/06/28 15:00 |
|  | : |  | : |

CACHE PARTITION PERFORMANCE INFORMATION 214

| STORAGE SUBSYSTEM NAME | CACHE PARTITION NAME | CACHE PARTITION HIT RATIO | TIME POINT |
|---|---|---|---|
| #9876 | 1 | 67% | 2005/06/28 14:00 |
| #9876 | 2 | 31% | 2005/06/28 14:00 |
| #9876 | 3 | 52% | 2005/06/28 14:00 |
| #9876 | 1 | 47% | 2005/06/28 15:00 |
|  | : |  | : |

FILE SYSTEM CONFIGURATION INFORMATION 113

| SERVER NAME | FILE SYSTEM NAME | SERVER-SIDE PORT NAME |
|---|---|---|
| mercury | /usr | 3 |
| mercury | /vol1 | 2 |
| mercury | /vol2 | 1 |
|  | : |  |

Columns: 740, 741, 742

FIG.9

LOGICAL VOLUME CONFIGURATION INFORMATION 215

| STORAGE SUBSYSTEM NAME | LOGICAL VOLUME NAME | STORAGE-SIDE PORT NAME | ARRAY GROUP NAME | CACHE PARTITION NAME |
|---|---|---|---|---|
| #9876 | 1 | 1 | 1 | 3 |
| #9876 | 2 | 2 | 1 | 3 |
| #9876 | 3 | 2 | 3 | 3 |
|  | : | : | : | : |

Columns: 750, 751, 752, 753, 754

FIG.10

SERVER STORAGE-RELATED INFORMATION 122

| SERVER NAME | FILE SYSTEM NAME | STORAGE SUBSYSTEM NAME | LOGICAL VOLUME NAME |
|---|---|---|---|
| mercury | /usr | #9876 | 2 |
| mercury | /vol1 | #9876 | 3 |
| mercury | /vol2 | #4567 | 4 |
| : | : | : | : |

CONFIGURATION INFORMATION 090

| SERVER NAME | FILE SYSTEM NAME | SERVER-SIDE PORT NAME | STORAGE SUBSYSTEM NAME | STORAGE-SIDE PORT NAME | ARRAY GROUP NAME | CACHE PARTITION NAME |
|---|---|---|---|---|---|---|
| mercury | /usr | 3 | #9876 | 2 | 1 | 3 |
| mercury | /vol1 | 2 | #9876 | 2 | 3 | 3 |
| mercury | /vol2 | 1 | #4567 | 1 | 4 | 2 |
| uranus | /home | 7 | #4567 | 4 | 2 | 5 |
| : | : | : | : | : | : | : |

PERFORMANCE INFORMATION 060

| RESOURCE TYPE | SERVER/ STORAGE SUBSYSTEM NAME | RESOURCE NAME | TIME POINT | PERFORMANCE VALUE |
|---|---|---|---|---|
| SERVER-SIDE PORT | mercury | 1 | 2005/06/28 14:00 | 6.2MB/s |
| SERVER-SIDE PORT | mercury | 2 | 2005/06/28 14:00 | 5.6MB/s |
| : | : | : | : | : |
| CACHE PARTITION | #9876 | 1 | 2005/04/25 14:00 | 67% |
| : | : | : | : | : |
| SERVER-SIDE PORT | mercury | 1 | 2006/06/28 15:00 | 4.5MB/s |
| : | : | : | : | : |

FIG.13

APPLICATION INFORMATION 070

| SERVER NAME | FILE SYSTEM NAME | APPLICATION NAME | IMPORTANCE DEGREE | I/O PEAK TIME ZONE |
|---|---|---|---|---|
| mercury | /usr | APPLICATION A | 2 | 03:00~06:00 |
| mercury | /vol1 | APPLICATION B | 3 | 09:00~18:00 |
| uranus | /opt | APPLICATION C | 4 | 21:00~03:00 |
| : | : | : | : | : |

FIG.15

RESOURCE CANDIDATE INFORMATION 086

| RESOURCE TYPE | SERVER/ STORAGE SUBSYSTEM NAME | RESOURCE NAME | AVERAGE PERFORMANCE VALUE | MAX. IMPORTANCE DEGREE OF APPLICATION SHARING RESOURCE | MAX. IMPORTANCE DEGREE OF APPLICATION SHARING I/O PEAK TIME ZONE |
|---|---|---|---|---|---|
| SERVER-SIDE PORT | mercury | 1 | 5.5MB/s | 2 | 1 |
| : | : | : | : | : | : |
| STORAGE-SIDE PORT | #9876 | 2 | 7.4MB/s | 3 | 2 |
| : | : | : | : | : | : |
| ARRAY GROUP | #9876 | 3 | 5.0ms | 3 | 0 |
| : | : | : | : | : | |

910 NEW APPLICATION INFORMATION INPUT VIEW

SERVER NAME [911]

I/O PEAK TIME ZONE [912] :00 ~ [913] :00

SELECT I/O PATH BASED ON AVERAGE PERFORMANCE VALUE FOR PAST [916 7] DAYS

FIG.19

920 I/O PATH EXTRACTION CONDITION INPUT VIEW

CONDITION [921 PULLDOWN MENU] THRESHOLD VALUE [927]

| |
|---|
| NOT SELECTED |
| AVERAGE TRANSFER RATE OF SERVER-SIDE PORTS |
| AVERAGE TRANSFER RATE OF STORAGE-SIDE PORTS |
| AVERAGE RESPONSE TIME OF ARRAY GROUPS |
| AVERAGE HIT RATIO OF CACHE PARTITIONS |
| MAX. IMPORTANCE DEGREE OF APPLICATION SHARING RESOURCES |
| MAX. IMPORTANCE DEGREE OF APPLICATION SHARING I/O PEAK TIME ZONE |

FIG.20

I/O PATH CANDIDATE DISPLAY SCREEN VIEW — 940

| | | | | |
|---|---|---|---|---|
| 946 | PATH CANDIDATE NUMBER | 1 | 2 | .. |
| 947 | SERVER-SIDE PORT NAME | 2 | 1 | .. |
| 948 | SERVER-SIDE PORT AVERAGE TRANSFER RATE | 5.8MB/s | 5.5MB/s | .. |
| 949 | STORAGE SUBSYSTEM NAME | #9876 | #4567 | .. |
| 950 | STORAGE-SIDE PORT NAME | 3 | 4 | .. |
| 951 | STORAGE-SIDE PORT AVERAGE TRANSFER RATE | 4.9MB/s | 4.2MB/s | .. |
| 952 | ARRAY GROUP NAME | 3 | 6 | .. |
| 953 | ARRAY GROUP AVERAGE RESPONSE TIME | 5.0ms | 3.4ms | .. |
| 954 | CACHE PARTITION NAME | 1 | 5 | .. |
| 955 | CACHE PARTITION AVERAGE HIT RATIO | 72% | 66% | .. |
| 956 | MAX. IMPORTANCE DEGREE OF APPLICATION SHARING RESOURCES | 3 | 2 | .. |
| 957 | MAX. IMPORTANCE DEGREE OF APPLICATION SHARING I/O PEAK TIME ZONE | 3 | 1 | .. |

STORAGE MANAGEMENT SYSTEM AND METHOD USING PERFORMANCE VALUES TO OBTAIN OPTIMAL INPUT/OUTPUT PATHS WITHIN A STORAGE NETWORK

The present application claims priority from Japanese application JP2005-245528 filed on Aug. 26, 2005, the content of which is hereby incorporated by reference into this application.

BACKGROUND OF THE INVENTION

This invention relates to a technique for managing a plurality of I/O (input/output) paths between a storage and a server.

In recent years, a SAN (Storage Area Network) constructing a dedicated network between a storage (also called a storage subsystem) such as disk devices and a server has been closely watched. This construction is expected to reduce the storage management cost and make it possible to effectively utilize the storage capacity.

In the SAN environment, I/O requests are issued from a plurality of application programs at a time to a component element (array group, etc.) for I/O processing in the storage. In the case where the I/O processes of any one of the application programs increase, therefore, the I/O performance of the other application programs is deteriorated. This problem is generally called the I/O collision.

While the existing application program is operating on the server, assume that a new application program is assigned to the component element for I/O processing in the storage. It is necessary to take into account both the effect of I/O performance of the new application program due to the I/O process of the existing application program and the effect of I/O performance of the existing application program due to the I/O process of the new application program.

In this situation, a conventional method has been disclosed to avoid the I/O collision for an array group in the storage. According to this method, before selecting an array group for which a new volume is created, the performance requested for the new volume is acquired. Next, all the volumes associated with each array group to which the new volume can be assigned are checked whether they meet the requested performance. In the presence of any array group meeting the requested performance, the new volume is created for the particular array group (See U.S. Pat. No. 6,748,489 for example).

SUMMARY OF THE INVENTION

In the case where an application program is assigned to a volume, however, various component elements such as a server port as well as the array group exist on the I/O path between the storage and the server. The I/O path between the storage and the server is preferably assigned, therefore, taking the interdependency (whether a combination is possible or not) of these component elements into consideration.

This invention has been achieved in view of this situation and the object thereof is to support an optimum I/O assignment path between the storage and the server.

In order to achieve this object, according to this invention, there is provided a storage management system comprising an application server assigned an application program, a storage subsystem having a storage area used for the application program, and a management server for managing an I/O path between the application server and the storage subsystem, wherein the management server includes a storage unit and a processing unit, wherein the storage unit of the management server manages a combination of the I/O path between the application server and the storage subsystem and various performance values of the component elements of the I/O path, and wherein the processing unit of the management server, upon receipt of a new request from an external device to assign an application program to a specified application server, acquires the I/O path between the particular application server and the storage subsystem combined with the application server from the combination of the I/O paths managed in the storage unit, and based on the various performance values managed by the storage unit, extracts an I/O path having the performance value meeting the conditions imposed by the external device from the I/O paths acquired, after which the extracted I/O path is output to the external device as a candidate path.

According to this invention, the assignment of the optimum I/O path between the storage and server can be supported.

Other objects, features and advantages of the invention will become apparent from the following description of the embodiments of the invention taken in conjunction with the accompanying drawings.

BRIEF DESCRIPTION OF THE DRAWINGS

FIG. 4 is a diagram showing an example of the data structure of the server-side port performance information.

FIG. 5 is a diagram showing an example of the data structure of the storage-side port performance information.

FIG. 6 is a diagram showing an example of the data structure of the array group performance information.

FIG. 7 is a diagram showing an example of the data structure of the cache partition performance information.

FIG. 8 is a diagram showing an example of the data structure of the file system configuration information.

FIG. 9 is a diagram showing an example of the data structure of the logical volume configuration information.

FIG. 10 is a diagram showing an example of the data structure the information related to the server storage.

FIG. 11 is a diagram showing an example of the data structure of the configuration information.

FIG. 12 is a diagram showing an example of the data structure of the performance information.

FIG. 13 is a diagram showing an example of the data structure of the application information.

FIG. 15 is a diagram showing an example of the data structure of the resource candidate information.

FIG. 18 is a diagram showing an example of display of an input view for the new application information.

FIG. 19 is a diagram showing an example of display of an input view for the I/O path extraction condition.

FIG. 20 is a diagram showing an example of display of an output view for the I/O path candidate.

DESCRIPTION OF THE EMBODIMENTS

Figure 1:
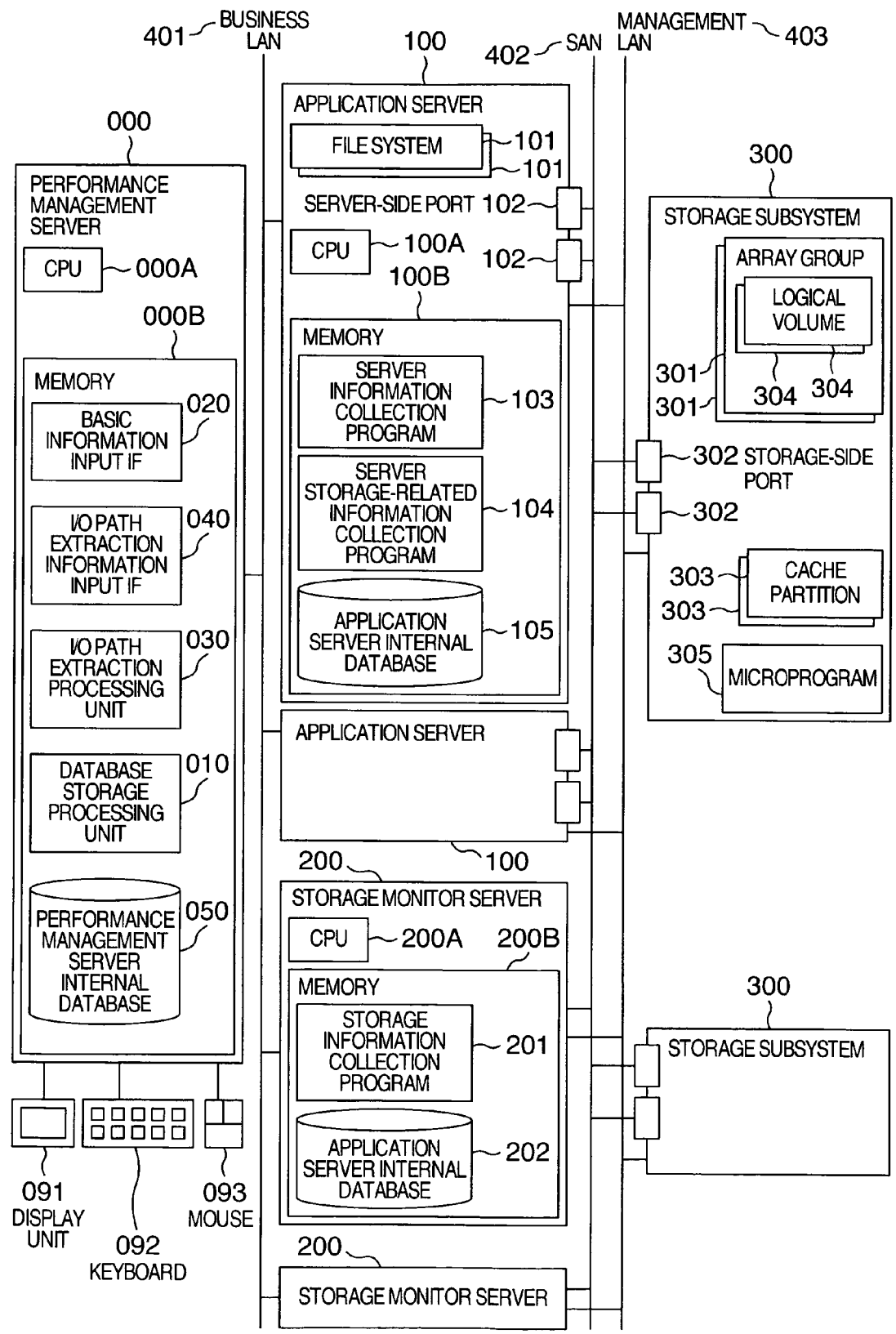
FIG. 1 is a block diagram showing an example of the configuration of a storage management system according to an embodiment of the invention.

FIG. 1 is a block diagram showing an example of a configuration of a storage management system according to an embodiment of the invention.

In FIG. 1, the storage management system includes a performance management server (also called a management server) 000, a plurality of application servers 100, a plurality of storage monitor servers 200 and a plurality of storage subsystems 300. The performance management server 000, the application servers 100 and the storage monitor servers 200 are connected to a business LAN (Local Area Network) 401.

The application servers 100, the storage monitor servers 200 and the storage subsystems 300 are each connected to a SAN 402 and a management LAN 403.

Although the SAN 402 is used for transmitting and receiving data between each server 100, 200 and each storage subsystem 300, the invention is not limited to this configuration and an ordinary network such as LAN may be used.

[Configuration of Performance Management Server]

Next, the configuration of the performance management server 000 is described in detail.

The performance management server 000, as shown in FIG. 1, includes a CPU (Central Processing Unit) 000A and a memory (storage unit) 000B.

The memory 000B includes a basic information input interface 020, an I/O path extraction information input interface 040, an I/O path extraction processing unit 030, a database storage processing unit 010 and a performance management server internal database 050 (also called the database 050).

The performance management server 000 is connected with a display unit 091, a keyboard (external device) 092 and a mouse (external device) 093.

[Configuration of Storage Subsystem]

Next, the configuration of the storage subsystem 300 is explained in detail. Although the internal configuration of one storage subsystem 300 is shown in FIG. 1, the other storage subsystems 300 have a similar internal configuration.

The storage subsystem 300, as shown in FIG. 1, includes a plurality of array groups 301, a plurality of storage-side ports 302, a plurality of cache partitions 303 and a microprogram 305 (stored in a memory not shown).

An array group 301 is defined as a single virtual storage unit into which a plurality of storage units (hard disk drives, etc.) are integrated by RAID (Redundant Array of Independent Disks). The array groups 301 each include a plurality of logical volumes (also called the storage areas) 304 adapted to be handled as an independent storage unit.

The microprogram 305 creates a partition, not shown, for each predetermined capacity, for example, on the array groups 301. The microprogram 305 has the function of assigning the partition to the application servers 100 through the SAN 402. This microprogram 305 is executed by a processing unit (not shown) such as a processor.

The partition is for dividing a plurality of storage units logically into a plurality of logical volumes 304. According to this embodiment, the partition is created for each predetermined capacity, i.e. each predetermined size. Nevertheless, the partition can alternatively be created for each arbitrary size set by a user.

In the case where the partition is created by the microprogram 305, the application servers 100 create the file systems 101 based on the particular partition. The file system 101 thus created and the partition may be in any of one-to-one, one-to-many, many-to-one and many-to-many relations.

Also, the microprogram 305 has the function of creating cache partitions 303 by dividing a cache not shown and assigning the cache partitions 303 to a plurality of logical volumes 304. The cache partitions 303, though assigned to a plurality of logical volumes 304 according to this embodiment, may alternatively be assigned to the array groups 301.

Further, the microprogram 305 has the function of periodically acquiring the performance value (such as transfer rate) of the storage-side ports 302, the array groups 301 and the cache partitions 303.

[Configuration of Application Server]

Next, the configuration of the application servers 100 is explained in detail. Although the internal configuration of one application server 100 is shown in FIG. 1, the other application servers 100 have a similar internal configuration.

The application servers 100 are for starting an application program (also called simply an application) assigned. As shown in FIG. 1, the application servers 100 each include a CPU 100A, a memory 100B, a plurality of file systems 101 and a plurality of server-side ports 102.

The memory 100B includes a server information collection program 103 (also called the collection program 103), a server storage-related information collection program 104 (also called the collection program 104), and an application server internal database 105 (also called the database 105). The collection programs 103, 104, the functions of which are described later, are operated by the CPU 100A.

The file systems 101 each receive an I/O request for a file system through the SAN 402, and in response to the I/O request, executes a predetermined process for the logical volumes 304 assigned to the file system.

[Configuration of Storage Monitor Server]

Next, the configuration of the storage monitor server 200 is explained in detail. Although the internal configuration of one storage monitor server 200 is shown in FIG. 1, the other storage monitor servers 200 have a similar internal configuration.

The storage monitor server 200, as shown in FIG. 1, includes a CPU 200A and a memory 200B.

The memory 200B has a storage information collection program 201 (also called the collection program 201) in operation and an application server internal database 202 (also called the database 202).

According to this embodiment, the storage monitor servers 200 are available in the same number as that of the storage subsystems 300, and each storage monitor server 200 monitors a different storage subsystem 300. Nevertheless, one storage monitor server 200 may monitor a plurality of storage subsystems 300.

According to this embodiment, the application servers 100, the server-side ports 102, the storage subsystems 303, the storage-side ports 302, the cache partitions 303, the file systems 101, the array groups 301 and the logical volumes 304 are collectively referred to as the resources.

Figure 2:
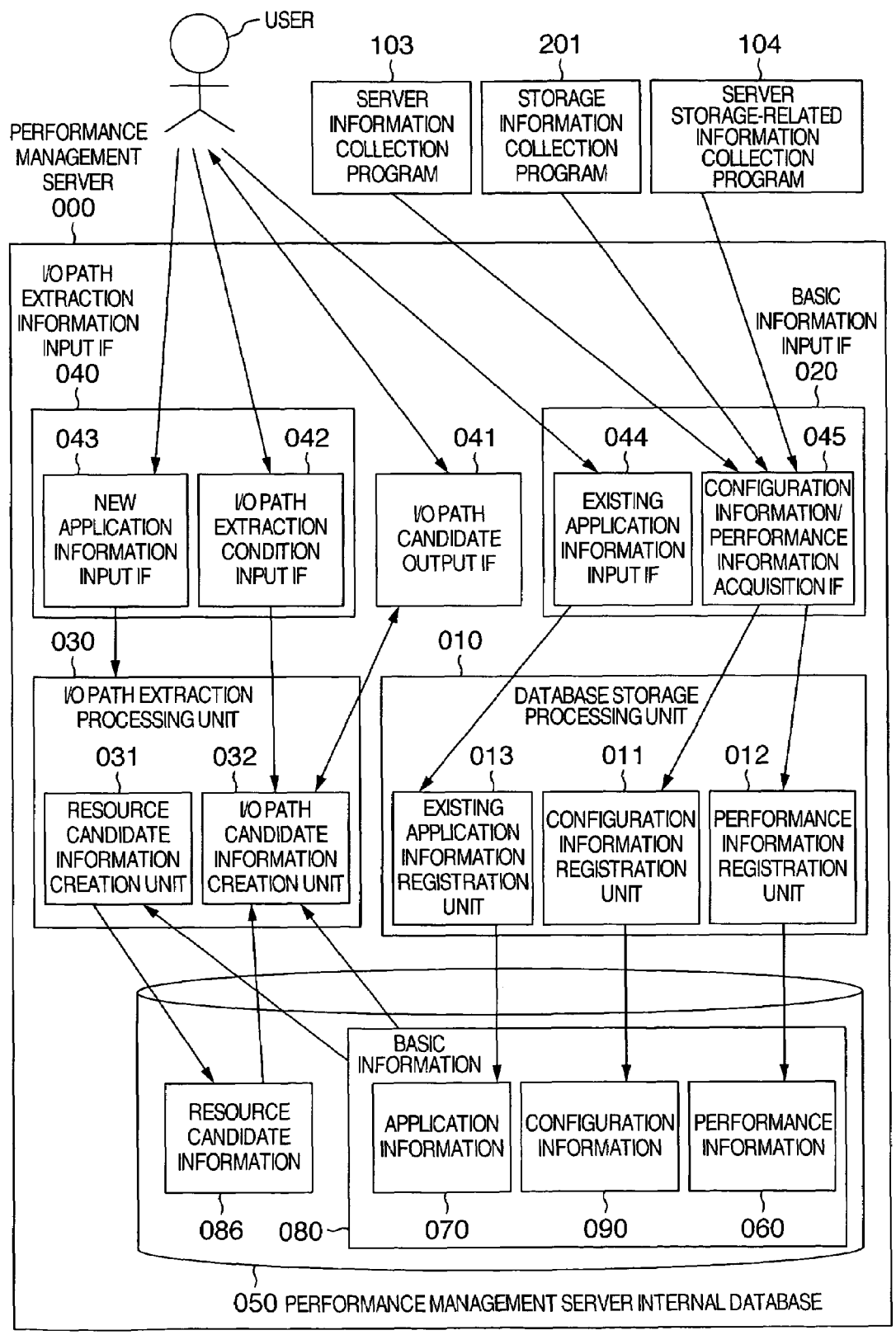
FIG. 2 is a diagram for explaining the functions of a performance management server.

FIG. 2 is a diagram for explaining the functions of the performance management server 000 (See FIG. 1 as required).

In FIG. 2, the collection programs 103, 104 and 201 each acquire the configuration information and the performance information of each resource from each of the application servers 100 and the storage subsystems 300.

The basic information input interface 020 executes the process of acquiring the information constituting the prerequisite for extraction of the I/O path, and includes an existing application information input interface 044 (also called the input interface 044), and a configuration information/performance information acquisition interface 045 (also called the acquisition interface 045).

The interface 044 acquires the information (an application name, etc.) on existing applications (already in operation) operating in the SAN environment. This information is input by the user operation of the keyboard 092, etc.

The acquisition interface 045 acquires the configuration information and the performance information of each resource from the collection programs 103, 104, 201. The configuration information indicates the relation of the resources existing in the route between the resources of the I/O source and the resources of the I/O destination in the I/O request made from the application server 100 to the storage subsystem 300.

The database storage processing unit 010 is for storing the information acquired by the basic information input interface 020 in the configuration information 090 on the database 050. The database storage processing unit 010 includes a configuration information registration unit 011, a performance information registration unit 012 and an existing application information registration unit 013.

The configuration information registration unit 011 extracts the configuration information for the configuration between the application server 100 and the storage subsystem 300 from the information acquired by the configuration information/performance information acquisition interface 045, and stores the configuration information in the configuration information 090. The performance information registration unit 012 extracts the performance information of the resources described later from the information acquired by the configuration information/performance information acquisition interface 045, and stores the performance information in the performance information 060 of the database 050. The performance information 060 represents various performance values (transfer rate (FIGS. 4, 5), response time (FIG. 6) and the cache hit ratio (FIG. 7)) of the component elements (server-side ports 102, the storage-side ports 302, the array groups 301, and the cache partitions 303) making up the I/O path.

The existing application information registration unit 013 stores the information acquired by the input interface 044 in the application information 070.

In place of the configuration information registration unit 011, the basic information input interface 020 may execute the process of the configuration information registration unit 011.

In FIG. 2, the configuration information 090, the performance information 060 and the application information 070 are collectively described as the basic information 080.

The I/O path extraction information input interface 040 (also called the input interface 040) acquires the information (the application name, etc.) on the new application (the application not in operation but to be newly activated) and the condition (the transfer rate of a given port, etc.) for the resources making up the I/O path, and delivers the information and the condition thus acquired to the I/O path extraction processing unit 030. The input interface 040 includes the new application information input interface 043 (also called the input interface 043) and the I/O path extraction condition input interface 042 (also called the input interface 042).

The input interface 043 acquires the name of the server for activating the new application and the I/O peak time zone of the new application. The I/O peak time zone is defined as an operation time zone of the application involved which is set by the user taking the strict request for the I/O performance and the effect on other applications into consideration. Specific contents of the I/O peak time zone are appropriately described later. The input interface 042 acquires the condition for the performance of the resources making up the I/O path and the condition for the application utilizing the resources making up the I/O path.

The I/O path extraction processing unit 030 searches the basic information 080 of the database 050 for the candidates for the I/O path between the application server 100 and the storage subsystem 300 based on the condition acquired by the input interface 040. The I/O path extraction processing unit 030 delivers the retrieved I/O path candidates to the I/O path candidate output interface 041 as an I/O path candidate list. The I/O path extraction processing unit 030 includes the resource candidate information creation unit 031 and the I/O path candidate information creation unit 032.

The resource candidate information creation unit 031 combines the basic information 080 and the input information from the input interface 043 to create the information on each resource described later, and temporarily stores it in the resource candidate information 086 on the database 050.

The I/O path candidate information creation unit 032 extracts the I/O path candidates based on the input information from the input interface 042 and the basic information 080 and the resource candidate information 086 on the database 050. The I/O path candidate information creation unit 032 delivers the extraction result to the I/O path candidate output interface 041.

The I/O path candidate output interface 041 executes the process of acquiring the I/O path candidate list from the I/O path candidate information creation unit 032 and supplying it to the user (for example, the process of displaying on the display unit 091).

Next, the functions of the application server 100 and the storage monitor server 200 are explained in detail with reference to FIG. 3.

First, the functions of the application server 100 are described. In the application server 100 shown in FIG. 3A, the collection program 103 in operation acquires the performance value (for example, the transfer rate) of each server-side port 102 assigned to the application server 100, and stores it in the server-side port performance information 112 of the database 105.

Also, the collection program 103 specifies the server-side port 102 used for each file system 101 (FIG. 2), and stores it in the file system configuration information 113 of the database 105.

Figure 3A:
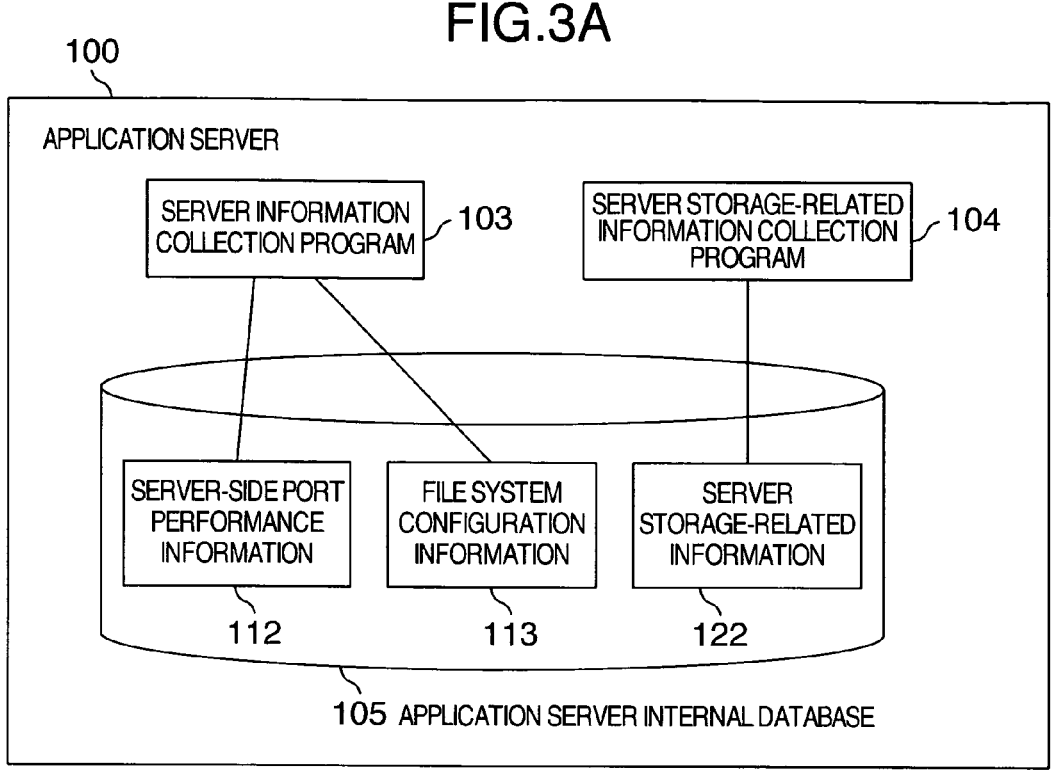
FIGS. 3A and 3B are diagrams for explaining the functions of an application server and a storage monitor server.

The collection program 104 shown in FIG. 3A acquires the information related to the application server 100 and the storage subsystem 300 from the application server 100 for which the program is in operation, and stores it in the server storage related-information 122 of the database 105.

The collection program 103 shown in FIG. 3A may acquire the performance value of each server-side port 102 according to the method described below. Specifically, the performance values of the server-side ports 102 are registered beforehand in the particular server-side port 102. Then, the collection program 103 acquires the performance value of the particular server-side port 102 using the API (Application Program Interface) supplied by the particular server-side port 102. As an alternative, the operating system working on the application server 100 periodically acquires the performance information of the server-side port 102, and then the collection program 103 acquires the performance information acquired by the operating system.

Also, the server-side port 102 used for each file system 101 may alternatively be specified by the notice from the operating system (having recorded therein the port name of the server-side port 102) operating on the application server 100 to which the logical volume 304 in the storage subsystem 300 is assigned through the SAN 402. As an alternative, the server-side port 102 used for each file system may be specified by executing the SCSI (Small Computer System Interface) inquiring command.

Next, the functions of the storage monitor server 200 are explained (See FIGS. 1, 2, as required).

Figure 3B:
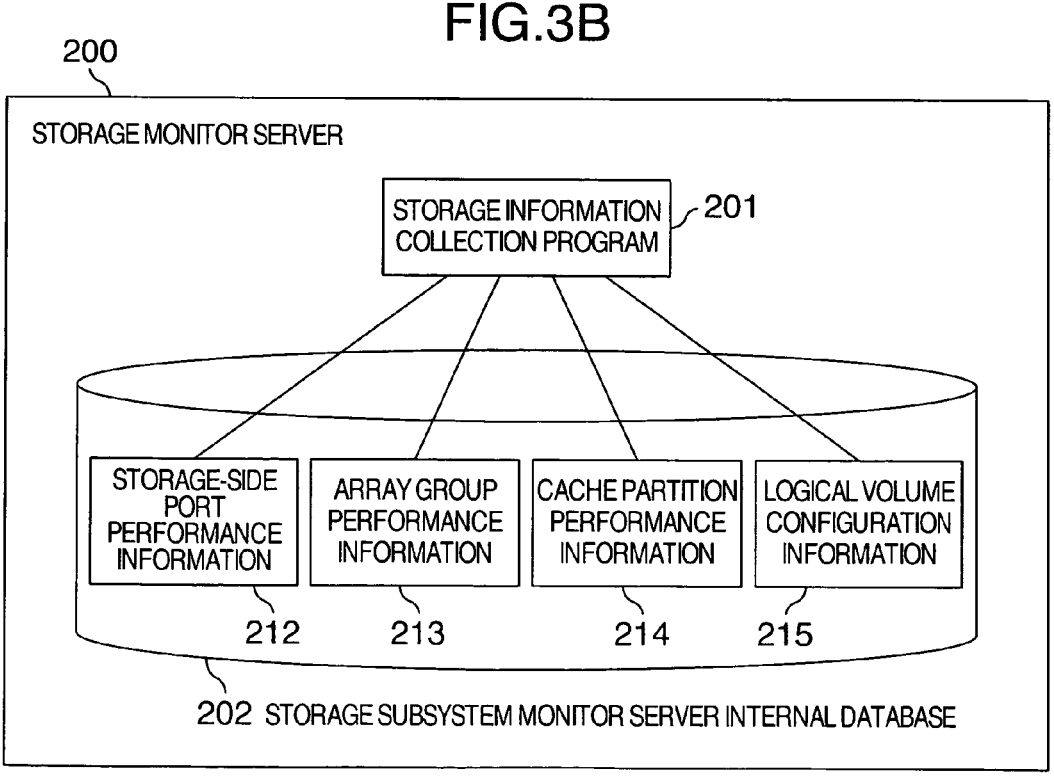

In the storage monitor server 200 shown in FIG. 3B, the collection program 201 monitors a single storage subsystem 300 through the SAN 402 and the management LAN 403. As the result of this monitor operation, the collection program 201 acquires the performance value (such as the transfer rate) of each storage-side port 302, the performance value (such as the response time) of each array group 301 and the performance value (such as the cache hit ratio) of each cache partition 303.

Also, the collection program 201 stores the acquired performance values in the storage-side port performance information 212, the array group performance information 213 and the cache partition performance information 214, respectively, of the database 202.

The storage-side port performance information 212 is a table for holding the performance value for each storage-side port 302, and the array group performance information 213 is a table for holding the performance value for each array group 301. Similarly, the cache partition performance information 214 is a table for holding the performance value for each cache partition 303.

Further, the collection program 201 acquires the name of each of the storage-side ports 302, the array groups 301 and the cache partitions 303 used for each logical volume 304 of the storage subsystem 300, and stores these names in the logical volume configuration information 215 of the database 202. The logical volume configuration information 215 is a table for holding the names of the storage-side port 302, the array group 301 and the cache partition 303 used by each logical volume 304.

The performance values and the configuration information described above are acquired by the microprogram 305 in the storage subsystem 300. The collection program 201 acquires, through the management LAN 403 or the SAN 402, each performance value and each configuration information acquired by the microprogram 305.

Next, an example of a data structure of the server-side port performance information 112 (FIG. 3A) is explained with reference to FIG. 4.

As shown in FIG. 4, the server-side port performance information 112 is a table having the columns of a server name 700, a server-side port name 701, a server-side port transfer rate 702 and time point 703. Each value in this table is acquired by the collection program 103 and stored periodically, for example.

The server name 700 indicates the server name ("mercury", for example) of the application server 100 for which the application program is in operation. The port name 701, on the other hand, indicates the port name ("1", for example) of the port held by the application server 100.

The transfer rate 702 indicates the transfer rate ("6.2 MB/s", for example) of the port designated by the port name 701, and the time point 703 indicates the time point at which the transfer rate designated by the transfer rate 702 is acquired.

FIG. 5 is a diagram showing an example of a data structure of the storage-side port performance information 212 (FIG. 3B).

As shown in FIG. 5, the storage-side port performance information 212 is a table having the columns of a storage subsystem name 710, a storage-side port name 711, a storage-side port transfer rate 712 and a time point 713. Each value in this table is acquired by the collection program 201 and stored periodically, for example.

The storage subsystem name 710 indicates the storage subsystem name ("#9876", for example) of the storage subsystem 300, and the storage-side port name 711 the port name of the storage-side port 302.

The transfer rate 712 indicates the transfer rate ("2.3 MB/s", for example) of the storage-side port 302, and the time point 713 the time point at which the transfer rate designated by the transfer rate 712 is acquired (the time point at which the collection program 201 acquires the transfer rate 712).

FIG. 6 is a diagram showing an example of a data structure of the array group performance information 213 (FIG. 3B).

As shown in FIG. 6, the array group performance information 213 is a table having the columns of a storage subsystem name 720, an array group name 721, an array group response time 722 and a time point 723. Each value in this table is acquired by the collection program 201 and stored periodically, for example.

The storage subsystem name 720 indicates the storage subsystem name ("#9876", for example) of the storage subsystem 300, and the array group name 721 the group name of the array group.

The response time 722 indicates the array group response time ("7.6 ms", for example), and the time point 723 the time point at which the response time designated by the response time 722 is acquired (the time point at which the collection program 201 acquires the response time 722).

FIG. 7 is a diagram showing an example of the data structure of the cache partition performance information 214 (FIG. 3B).

As shown in FIG. 7, the cache partition performance information 214 is a table having the columns of a storage subsystem name 730, a cache partition name 731, a cache partition hit ratio 732 and a time point 733. Each value in this table is acquired and stored periodically, for example, by the collection program 201.

The storage subsystem name 730 indicates the storage subsystem name ("#9876", for example) of the storage subsystem 300. The cache partition name 731 indicates the name of the cache partition 303.

The hit ratio 732 indicates the probability of presence of the requested data on the cache in the case where the logical volume 304 related to the cache partition 303 is accessed. This hit ratio is determined by, for example, dividing the number of cache hits by the total number of accesses to the logical volume 304 related to the cache partition 303.

The time point 733 indicates the time point at which the hit ratio designated by the hit ratio 732 is acquired (the time point at which the collection program 201 acquires the hit rate 732).

FIG. 8 is a diagram showing an example of the data structure of the file system configuration information 113 (FIG. 3A).

As shown in FIG. 8, the file system configuration information 113 is a table having the columns of a server name 740, a file system name 741 and a server-side port name 742. Each value in this table is acquired and stored periodically, for example, by the collection program 103.

The server name 740 indicates the server name ("mercury", for example) of the application server 100 for which the application program is in operation, and the file system name 741 the file system name of the corresponding file system 101.

The port name 742 indicates the port name of the server-side port 102 held by the application server 100.

FIG. 9 is a diagram showing an example of the data structure of the logical volume configuration information 215 (FIG. 3B).

As shown in FIG. 9, the logical volume configuration information 215 is a table having the columns of a storage subsystem name 750, a logical volume name 751, a storage-side port name 752, an array group name 753 and a cache partition name 754. Each value in this table is acquired and stored periodically, for example, by the storage information collection program 201.

The logical volume name 751 is for identifying the logical volume 304, and indicates the logical volume name. Each value of a storage subsystem name 750, a storage-side port name 752, an array group name 753 and a cache partition 754 is similar to each value of the storage subsystem names 710, 720, 730 (FIGS. 5 to 7), the storage-side port name 711 (FIG. 5), the array group name 721 (FIG. 6) and the cache partition name 731 (FIG. 7), respectively.

FIG. 10 is a diagram showing an example of the data structure of the sever storage-related information 122 (FIG. 3A).

As shown in FIG. 10, the server storage-related information 122 is a table having the columns of a server name 760 similar to the server name 700, a file system name 761, a storage subsystem name 762, and a logical volume name 763. Each value of the file system name 761, the storage subsystem name 762 and the logical volume name 763 is acquired by the collection program 104 from the application server 100 for which the collection program 104 is operated, and stored in the corresponding column.

Each value of the file system name 761, the storage subsystem name 762 and the logical volume name 763 may alternatively be acquired by the collection program 104 from the operating system. In this case, each value of the file system name 761, the storage subsystem name 762 and the logical volume name 763 are recorded by the operating system operating on the application server 100 when the logical volume 304 is disclosed to the particular application server 100 through the SAN 402.

Also, each value of the file system name 761, the storage subsystem name 762 and the logical volume name 763 may alternatively be acquired by execution of the SCSI inquiring command.

According to this embodiment, the collection programs 103, 104 shown in FIG. 2 store the information in the database 105 at regular time intervals of, say, one hour.

The collection program 201 shown in FIG. 2, on the other hand, stores the information in the database 202 at regular time intervals of, say, one hour. With regard to the value of the transfer rate 702 of the server-side port 102 acquired and stored by the collection program 103 and the value of the transfer rate 712 of the storage-side port 302 acquired and stored by the collection program 201, the average value of the collection value for the past one hour (for example, all the values collected at intervals of one minute) is calculated and stored.

Also, with regard to the response time of the array groups 301 and the hit ratio of the cache partitions 303, the average value is calculated and stored from the values collected, for example, for the past one hour (for example, all the values collected at intervals of one minute). With regard to other values, the values acquired at intervals of one hour are stored.

The collection programs 103, 104, 201 shown in FIG. 2, upon receipt of an inquiry from the acquisition interface 045, send the information held in the particular programs to the acquisition interface 045, after which the information held in the programs is deleted.

Returning to FIG. 2, the function of the input interface 020 is explained in detail.

The input interface 044 causes the display unit 091 to output (display) the input view (FIG. 17) for the existing application to the output unit (display unit 091, etc.). Also, the input interface 044 delivers the input data of the input view 900 to the existing application information registration unit 013.

The input view 900 is for causing the user to input (by the input operation of the keyboard 092 or the mouse 093) the server name of the application server 100 for operating the existing application, the corresponding file system name and the I/O peak time zone. An example of display of the input view 900 is shown in FIG. 17.

Figure 17:
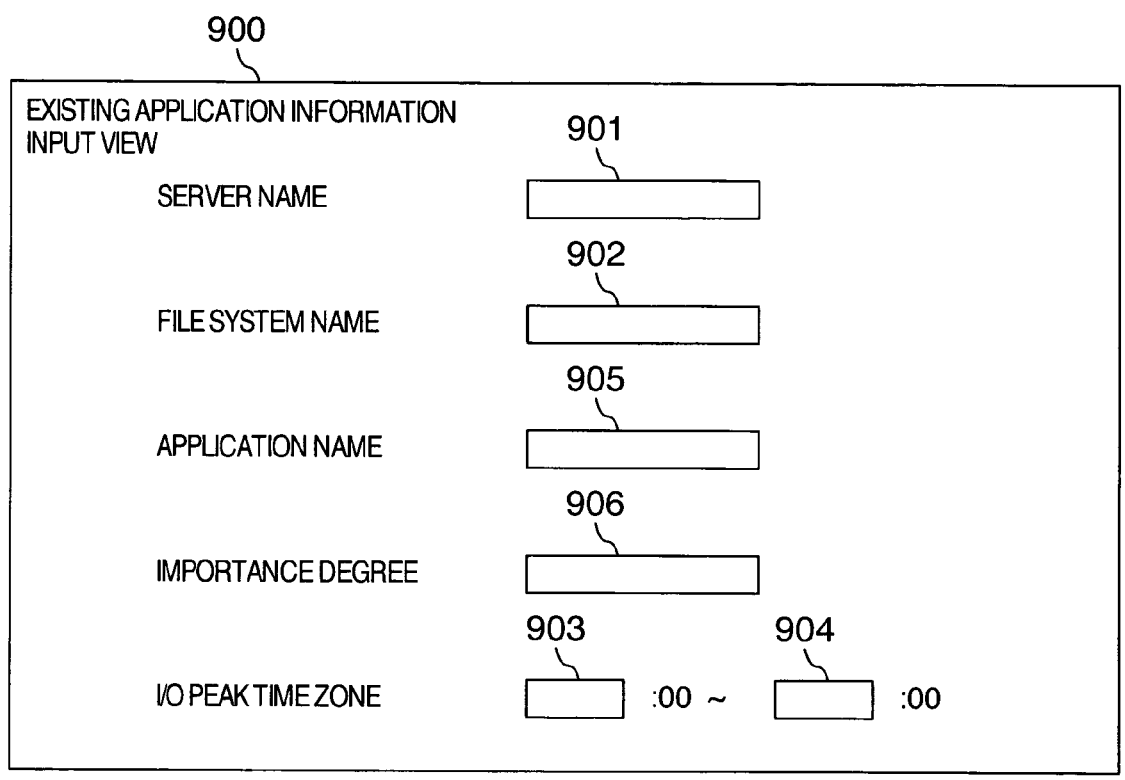
FIG. 17 is a diagram showing an example of display of an input view for the existing application information.

The input view 900, as shown in FIG. 17, includes an input column 901 of the server name of the application server, an input column 902 for the file system name of the file system, an input column 905 for the application name, and input columns 903, 904 for the I/O peak time zone. Also, the input view 900 includes an input column 906 for the degree of importance of the applications. The values in these input columns 901 to 906 are input by the user operating the keyboard 092 or the mouse 093, as values desired by him/her.

Returning to FIG. 2, the acquisition interface 045 acquires the information periodically, for example, from each of the collection programs 103, 104, 201 and delivers them to the configuration information registration unit 011 and the performance information registration unit 012. Specifically, as shown in FIG. 3A, the acquisition interface 045 collects the server-side port performance information 112 (FIG. 4) and the file system configuration information 113 (FIG. 8) from the collection program 103, and delivers the server-side performance information 112 to the performance information registration unit 012 and the file system configuration information 113 to the configuration information registration unit 011.

Also, the acquisition interface 045 collects the storage-side port performance information 212 (FIG. 5), the array group performance information 213 (FIG. 6), the cache partition performance information 214 (FIG. 7) and the logical volume configuration information 215 (FIG. 9) from the collection program 201. The acquisition interface 045 delivers the performance information 212, 213, 214 to the performance information registration unit 012, and the logical volume configuration information 215 to the configuration information registration unit 011.

Further, the acquisition interface 045 acquires the server storage-related information 122 (FIG. 10) from the collection program 104 and delivers it to the configuration information registration unit 011.

Next, the process executed by the database storage processing unit 010 is explained in detail (FIG. 2).

The database storage processing unit 010 includes the existing application information registration unit 013, the performance information registration unit 012 and the configuration information registration unit 011.

The existing application information registration unit 013 stores the information acquired by the input interface 044 in the application information 070.

An example of the data structure of this application information 070 is shown in FIG. 13. The application information 070 is the information on the applications utilizing the file system 101 on the application server 100. As shown in FIG. 13, the application information 070 includes such items as a server name 841, a file system name 842, an application name 843, an importance degree 844 and an I/O peak time zone 845. The values designated in these items correspond to the values of the input columns 901 to 906, respectively, of the input view 900 shown in FIG. 17.

The existing application information registration unit 013 shown in FIG. 2 acquires the following information from the input interface 044 through the input view 900 shown in FIG. 17, and registers them in the application information 070. The values of the server name, the file system name, the application name, the importance degree and the I/O peak time zone are input in the input columns 901 to 906, respectively, of the input view 900 shown in FIG. 17.

The performance information registration unit 012 acquires the performance information of the server-side port 102 from the collection program 103 and registers it in the performance information 060 of the database 050. Also, the performance information registration unit 012 acquires the performance information of the storage-side ports 302, the performance information of the array groups 301 and the performance information of the cache partitions 303 from the collection program 201 and registers them in the performance information 060 of the database 050.

An example of the data structure of the performance information 060 is shown in FIG. 12.

The performance information 060 shown in FIG. 12 is a table having the columns of a resource type 821, a server/storage subsystem name 822, a resource name 823, a time point 824, and a performance value 825.

The resource type 821 indicates the type of the server-side ports 102, the cache partitions 303, the storage-side ports 302 or the array groups 301.

The server/storage subsystem name 822 indicates the server name or the storage subsystem name of the corresponding resource (the application server 100 or the storage subsystem 300).

The resource name 823 is for identifying the resource designated by resource type and indicates, for example, the port number as a resource name.

The time point 824 indicates the performance value (for example, the port transfer rate of 6.2 MB/s) designated by the performance value 825 described later.

[Functions of Performance Information Registration Unit]

Next, the functions of the performance information registration unit 012 shown in FIG. 2 are explained in detail.

First, the process executed by the performance information registration unit 012 to store the performance information (for example, the transfer rate) of the server-side ports 102 in the performance information 060 is explained.

The performance information registration unit 012 acquires the server-side port performance information 112 (the values of the server name 700, the server-side port name 701, the server-side port transfer rate 702 and the time point 703 shown in FIG. 4) from the configuration information/performance information acquisition interface 045. The performance information registration unit 012 stores the server name, the server-side port name, the server-side port transfer rate and the time point in the server/storage subsystem name 822, the resource name 823, the performance value 825 and the time point 824, respectively, of the performance information 060 (FIG. 12). The performance information registration unit 012 stores the character string "server-side port" in the resource type 821 on the corresponding row of the performance information 060.

Also, explanation is made about the process executed by the performance information registration unit 012 to store the performance information (the transfer rate, for example) of the storage-side ports 302 in the performance information 060.

The performance information registration unit 012 acquires the storage-side port performance information 212 (the values of the storage subsystem name 710, the storage-side port name 711, the storage-side port transfer rate 712 and the time point 713 shown in FIG. 5) from the configuration information/performance information acquisition interface 045. The performance information registration unit 012, as in the case of the performance information of the server-side ports 102 described above, stores the storage subsystem name, the storage-side port name, the storage-side port transfer rate and the time point in the server/storage subsystem name 822, the resource name 823, the performance value 825 and the time point 824, respectively, of the performance information 060 (FIG. 12). The performance information registration unit 012 stores the character string "storage-side port", not shown, in the resource type 821 on the corresponding line of the performance information 060. The performance information can be registered similarly for other resources.

Next, explanation is made about the process executed by the performance information registration unit 012 to store the performance information of the array groups 301 in the performance information 060.

The performance information registration unit 012 acquires the array group performance information 213 (the values of the storage subsystem name 720, the array group name 721, the array group response time 722 and the time point 723 shown in FIG. 6) from the acquisition interface 045. The performance information registration unit 012 stores the values of the storage subsystem name, the array group name, the array group response time and the time point in the server/storage subsystem name 822, the resource name 823, the performance value 825 and the time 824, respectively, of the performance information 060 (FIG. 12). The performance information registration unit 012 stores the character string "array group" in the resource type 821 on the corresponding row of the performance information 060.

Further, explanation is made about the process executed by the performance information registration unit 012 to store the performance information of the cache partitions 303 in the performance information 060.

The performance information registration unit 012 acquires the cache partition performance information 214 (the values of the storage subsystem name 730, the cache partition name 731, the cache partition hit ratio 732 and the time point 733 shown in FIG. 7) from the acquisition interface 045. The performance information registration unit 012 stores the values of the storage subsystem name, the cache partition name, the cache partition hit ratio and the time point in the server/storage subsystem name 822, the resource name 823, the performance value 825 and the time point 824, respectively, of the performance information 060 (FIG. 12). The performance information registration unit 012 stores the character string "cache partition" in the resource type 821 on the corresponding row of the performance information 060.

[Functions of the Configuration Information Registration Unit]

Next, the functions of the configuration information registration unit 011 shown in FIG. 2 are explained.

The configuration information registration unit 011 acquires the information periodically from the collection programs 103, 104, 201. The configuration information registration unit 011, based on the information thus acquired, creates the configuration information of the resources existing between the application server 100 and the storage subsystem 300, and stores the configuration information thus created in the configuration information 090 of the database 050. The configuration information 090 represents a combination of the I/O paths between the application server 100 and the storage subsystem 300, and holds the resource name available to which transmission of an I/O request to the file system 101 can be propagated.

An example of the data structure of the configuration information 090 is shown in FIG. 11.

As shown in FIG. 11, the configuration information 090 is a table having the columns of a server name 801, a file system name 802, a server-side port name 803, a storage subsystem name 804, a storage-side port name 805, an array group name 806 and a cache partition name 807.

Returning to FIG. 2, the functions of the configuration information registration unit 011 are explained in detail.

The configuration information registration unit 011 acquires the file system configuration information 113 (the values of the server name 740, the file system name 741, server-side port name 742 shown in FIG. 8) collected by the collection program 103. The configuration information registration unit 011 also acquires the logical volume configuration information 215 (the values of the storage subsystem name 750, the logical volume name 751, the storage-side port name 752, the array group name 753, the cache partition name 754 in FIG. 9). Further, the configuration information registration unit 011 acquires the server storage-related information 122 (the values of the server name 760, the file system name 761, the storage subsystem number 7262, the logical volume name 763 in FIG. 10) collected by the collection program 104.

The configuration information registration unit 011 creates the configuration information 090 by combining the values of the file system configuration information 113, the logical volume configuration information 215 and the server storage-related information 122 acquired, based on the file system name and the logical volume name. Specifically, the configuration information registration unit 011 acquires all the combinations of the values of the server name 740 and the file system name 741 from the file system configuration information 113.

Then, the configuration information registration unit 011 compares the combinations of each value acquired with the combinations of the values of the server name 760 and the file system name 761 acquired from the server storage-related information 122, and extracts the row of the coincident server storage-related information 122 (FIG. 10).

Next, the configuration information registration unit 011 acquires all the combinations of the values of the storage subsystem name 762 and the logical volume name 763 shown in the row extracted. The configuration information registration unit 011 compares the acquired combinations with the combinations of the values of the storage subsystem name 750 and the logical volume name 751 in the logical volume configuration information 215 (FIG. 9), and extracts all the rows of the coincident logical volume configuration information 215.

Then, the configuration information registration unit 011 stores the value of the server name 760 of the file system configuration information 113 in the sever name 801 of the configuration information 090 (FIG. 11), and the value of the file system name 761 in the filed system name 802 of the configuration information 090. Also, the configuration information registration unit 011 stores the value of the server-side port name 742 in the server-side port name 803 of the configuration information 090, while at the same time storing the value of the storage subsystem name 750 in the storage subsystem name 804 of the configuration information 090. Further, the configuration information registration unit 011 stores the value of the storage-side port name 752 in the storage-side port name 805 of the configuration information 090, while at the same time storing the value of the array group name 753 in the array group name 806 of the configuration information 090.

Also, the configuration information registration unit 011 stores the value of the cache partition name 807 of the configuration-information 090. The configuration information registration unit 011 executes this storage process for all the combinations of the values of the file system name 741 and the server name 740 acquired from the file system configuration information 113.

Next, the processes executed by the I/O path extraction process unit 030, the input interface 040 and the output interface 041 are explained in detail.

[Functions of Input Interface]

First, the functions of the input interface 040 are explained. The input interface 040 includes two input interfaces 042, 043 (FIG. 2).

The input interface 043 is for acquiring the server name of the application server 100 for activating a new application and the I/O peak time zone of the particular new application. The server name and the I/O peak time zone are acquired through the input view 910 shown in FIG. 18.

The input view 910 shown in FIG. 18 is displayed on the display unit 091, and includes an input column 911 of the server name of the application server 100 and input columns 912, 913 of the I/O peak time zone. The values of these input columns 911 to 913 are designated by the input operation of the input devices (the keyboard 092 and the mouse 093) by the user. Each designated value of the input columns 911 to 913 is delivered to the I/O path extraction processing unit 030 by the input interface 043.

Returning to FIG. 2, the input interface 042 acquires the conditions for the performance of the resources making up the I/O path or the conditions for the application utilizing the resources making up the I/O path. These conditions are acquired through the input view 920 shown in FIG. 19.

The input view 920 shown in FIG. 19 includes a pulldown menu 921 which contains the conditions described above. Specifically, the four conditions for the performance of the resources making up the I/O path include the average transfer rate of the server-side ports 102, the average transfer rate of the storage-side ports 302, the average response time of the array groups 301 and the average hit ratio of the cache partitions 303. Also, two conditions for the application utilizing the resources making up the I/O path include the maximum importance degree of the application using the resources and the maximum importance degree of the applications sharing the I/O peak time zones. Further, the condition "not selected" designating no conditions is also included in the pulldown menu 921.

The user can select one out of the seven conditions of the pulldown menu 921 using, for example, the mouse 093. The condition thus selected is delivered to the I/O path candidate information creation unit 032 through the input interface 043.

Although a case in which one selectable condition is available is explained with reference to FIG. 19, a plurality of conditions may be selectable. In the case where a plurality of conditions can be selected, the process executed by the I/O path candidate information creation unit 032 is different from a case in which one condition can be selected, as described later.

Next, the process executed by the I/O path extraction processing unit 030 shown in FIG. 2 is explained.

The I/O path extraction processing unit 030 includes a resource candidate information creation unit 031 and an I/O path candidate information creation unit 032.

The resource candidate information creation unit 031, by combining the input information and the basic information 080 from the input interface 043, creates the performance average value of each resource and the maximum importance degree of the application related to each resource, and stores them in the resource candidate information 086 of the database 050. An example of the data structure of the resource candidate information 086 is shown in FIG. 15.

As shown in FIG. 15, the resource candidate information 086 includes a resource type 871, a server/storage subsystem name 872, a resource name 873 and an average performance value 874. Also, the resource candidate information 086 includes a maximum importance degree 875 of the application using the resource and the maximum importance degree 876 of the applications sharing the I/O peak time zone.

The average value indicated in the average performance value 874 is obtained in such a manner that the values designated by the performance value 825 in FIG. 12 are classified and the average value calculated for each resource type 871 and each resource name. The time interval at which the average value is calculated is set in advance.

The maximum importance degree 875 indicates the importance degree of an application considering mainly the resources (the server-side ports 102, the storage-side ports 302, the array groups 301, the cache partitions 303). This importance degree is designated from preset ranks.

The maximum importance degree 876 indicates the importance degree of the applications sharing the I/O peak time zones. This importance degree is also designated from preset ranks. This designation makes it possible to set the order of importance of the applications sharing the I/O peak time zone.

The resource type 871, the server/storage subsystem name 872 and the resource name 873 have similar contents to the resource type 821, the server/storage subsystem name 822 and the resource name 823, respectively, shown in FIG. 12.

Returning to FIG. 2, the I/O path candidate information creation unit 032 extracts the I/O path candidate, described later, based on the input information from the input interface 042, the resource candidate information 086 and the basic information 080, after which the extraction result is delivered to the I/O path candidate output interface 041.

Next, an example of the process executed by the resource candidate information creation unit 031 is explained with reference to FIG. 14.

Step 605 acquires a list of resources available for use by the new application (designated in the server name input column 911) designated on the input view 910 shown in FIG. 18. Specifically, the performance information 060 shown in FIG. 12 is extracted, except for the information on the server-side ports 102 (for example, the row of the server-side port designated by the resource type) that cannot be used by the new application designated. In other words, only the row is extracted in which the character string designated by the server/storage subsystem name 822 (FIG. 12) is identical with the server name input to the input column 091 included in the input view 910 shown in FIG. 18.

At Step 610, the data duplication is excluded in the acquired resource list and a resource set is acquired. At Step 605 before excluding the data duplication, all the rows having a combination of the values designated by the resource type 821, the server/storage subsystem name 822 and the resource name 823 are acquired from the rows (resource list) extracted from the performance information 060 shown in FIG. 12. From all the rows thus acquired, a set of combinations is created lacking the rows having a data-duplicated combination.

Step 615 checks whether the resource set created at Step 610 is vacant or not. Specifically, it is checked whether the number of elements (number of rows) of the combination set (resource set) is zero or not. In this way, all the rows making up the resource set are processed.

In the case where the determination at Step 615 is 0, it is determined that the resource set is vacant (YES at Step 615), and the process of the resource candidate information creation unit 031 is terminated. In the case where the determination is not 0, on the other hand, it is determined that the resource set is not vacant (NO at Step 615), and the process proceeds to Step 620.

At Step 620, one resource is retrieved from the combination set constituting the resource set created at Step 610, and the retrieved resource is deleted from the resource set.

At Step 625, the average performance value of the resource retrieved at Step 620 is calculated based on the performance information 060. Specifically, first, only the information is extracted which shares the operation time zone (the time zone designated as the I/O peak time zone in FIG. 18) of the new application and which is included in the period designated by the input column 916 of the input view 910 shown in FIG. 18. From the information thus extracted, the average value of the performance value is calculated.

More specifically, from the rows extracted from the performance information 060 at Step 605, a row is selected in which the combination of the values designated in the resource type 821, the server/storage subsystem name 822 and the resource name 823 (FIG. 12) is coincident with the combination retrieved at Step 620. Next, from this extraction result, only the row is extracted in which the value designated by the time point 824 shares the time zone of the value input to the two input columns 912, 913 of the I/O peak time zone shown in FIG. 18 and in which the difference between the time designated by the time point 824 of the performance information 060 and the present time is not more than the value (number of days) input to the input column 916 of the input view 910 shown in FIG. 18. Then the average of the values designated by the performance value 825 included in the extracted line is determined.

Step 630, with regard to the row of the resource set for the resources retrieved at Step 620, checks whether the resource type designated by the particular row is "the server-side port" or not. In the case where the resource type is "the server-side port" (YES at Step 630), the process proceeds to step 633, while in the case where the resource type is not "the server-side port" (NO at Step 630), on the other hand, the process proceeds to step 635.

At Step 633, the maximum importance degree of an application is calculated from the importance degree (FIG. 13) of the applications corresponding to the server-side ports 102. Specifically, from the rows making up the configuration information 090 (FIG. 11), the row containing the server/storage subsystem name and the resource name designated on the row of the set of the resources retrieved at Step 620 is extracted. Further, from the rows indicated in the extraction result, the combination of the values designated by the server name 801 and the file system name 802 is acquired.

Next, the rows making up the application information 070 (FIG. 13) are searched for a row containing the combination of the values designated by the server name 841 and the file system name 842. From the importance degree 844 contained in the row indicated by the search result, the maximum importance degree (the maximum value designated by the importance degree 844) is determined. Finally, from the rows designated by the search result, only the rows in which the I/O peak time zone 845 contains a time zone shared with the time zone input to the two input columns 912, 913 of the input view 910 (FIG. 18) are extracted. From the importance degree 844 contained in the extracted rows, the maximum importance degree (the maximum value designated by the importance degree 844) is determined, after which the process proceeds to Step 650.

At Step 635, the rows of the set of the resources retrieved at Step 620 are checked to see whether the resource type designated by the row is "storage-side ports" or not. In the case where the "storage-side ports" are involved (YES at Step 635), the process proceeds to Step 638, while the "storage-side ports" are not involved (NO at Step 635), on the other hand, the process proceeds to Step 640.

At Step 638, from the importance degree 844 (FIG. 13) of the application corresponding to the server-side ports 102, the maximum importance degree of the application is calculated. Specifically, from the rows making up the configuration information 090 (FIG. 11), the row containing the storage subsystem name 804 and the storage-side port name 805 designated by the row of the set of the resources retrieved at Step 620 is extracted. From the rows indicated by the extraction result, the set of the values designated by the server name 801 and the file system name 802 is acquired.

Next, the rows making up the application information 070 (FIG. 13) are searched for the row containing the set of the values designated by the server name 841 and the file system name 842. From the importance 844 contained in the row indicated by the search result, the maximum importance degree (the maximum value designated by the importance degree 844) is determined. Finally, from the search result, only the rows in which the I/O peak time zone 845 is contained in the time zone input to the I/O peak time zone input column 912 and the I/O peak time zone input column 913 are extracted. From the importance degree 844 contained in the extracted row, the maximum importance degree (the maximum value designated by the importance degree 844) is determined, after which the process proceeds to Step 650.

At Step 640, the rows of the set of the resources retrieved at Step 620 are checked to see whether the resource type designated by the particular rows is "array groups" or not. In the case where the "array groups" are involved (YES at Step 640), the process proceeds to Step 643, while in the case where the "array groups" are not involved (NO at Step 640), the process proceeds to step 645.

At Step 643, from the importance degree (FIG. 13) of the application corresponding to the array groups 301, the maximum importance degree of the application is calculated. Specifically, from the rows making up the configuration information 090 (FIG. 11), the row containing the storage subsystem name 804 and the array group name 806 designated by the set of the resources retrieved at Step 620 is extracted. From the row indicated by the extraction result, the set of the values designated by the server name 801 and the file system name 802 is acquired.

Next, the rows making up the application information 070 (FIG. 13) are searched for the row containing the set of the values designated by the server name 841 and the file system name 842. From the importance 844 contained in the row indicated by the search result, the maximum importance degree (the maximum value designated by the importance degree 844) is determined. Finally, from the search result, only the rows in which the I/O peak time zone 845 is contained in the time zone input to the I/O peak time zone input column 912 and the I/O peak time zone input column 913 are extracted. From the importance degree 844 contained in the extracted row, the maximum importance degree (the maximum value designated by the importance degree 844) is determined, after which the process proceeds to Step 650.

At Step 645, the rows of the set of the resources retrieved at Step 620 are checked to see whether the resource type designated by the particular rows is "cache partitions" or not. In the case where the "cache partitions" are involved (YES at Step 645), the process proceeds to Step 648, while in the case where the "cache partitions" are not involved (NO at Step 645), the process proceeds to Step 615.

At Step 648, from the importance degree 844 (FIG. 13) of the application corresponding to the cache partitions, the maximum importance degree of the application is calculated. Specifically, from the rows making up the configuration information 090 (FIG. 11), the row containing the storage subsystem name 804 and the cache partition name 807 designated by the row of the set of the resources retrieved at Step 620 is extracted. From the row indicated by the extraction result, the set of the values designated by the server name 801 and the file system name 802 is acquired.

Next, the rows making up the application information 070 (FIG. 13) are searched for the row containing the set of the values designated by the server name 841 and the file system name 842. From the importance 844 contained in the row indicated by the search result, the maximum importance degree (the maximum value designated by the importance degree 844) is determined. Finally, from the search result, only the rows in which the I/O peak time zone 845 is contained in the time zone input to the I/O peak time zone input column 912 and the I/O peak time zone input column 913 are extracted. From the importance degree 844 contained in the extracted row, the maximum importance degree (the maximum value designated by the importance degree 844) is determined, after which the process proceeds to Step 650.

At Step 650, the value determined by calculation at any of Steps 633, 638, 643, 648 is stored in the database 050.

Specifically, the resource type contained in the rows of the set of the resources retrieved at Step 620 is stored in the resource type 871 of the resource candidate information 086, and the server/storage subsystem contained in the particular row is stored in the server/storage subsystem name 822. Also, the resource name contained in the particular row is stored in the resource name 823, and the average performance value calculated at Step 625 is stored in the average performance value 874.

Further, the first and second maximum values calculated at any of Steps 633, 638, 643, 648 are stored in the items 875, 876 of the resource candidate information (FIG. 15), and returning to step 615, the process of Step 620 and subsequent steps is repeated for all the rows until the resource set becomes vacant.

Next, an example of the process executed by the I/O path candidate information creation unit 032 is explained with reference to FIG. 16. First, the provisional table created internally by the I/O path candidate information creation unit 032 is explained, and then the process of each step shown in FIG. 16.

The I/O path candidate information creation unit 032 has two provisional tables including a storage-side port list and an I/O path candidate list. The storage-side port list has the same columns (items 871 to 876 in FIG. 15) as the resource candidate information 086 shown in FIG. 15.

The I/O path candidate list, on the other hand, contains the information including a server-side port name, a server-side port average transfer rate, a storage subsystem name, a storage-side port name, a storage-side port average transfer rate, an array group name, an array group average response time and a cache partition name. The table also contains the cache partition average hit ratio, the maximum importance degree of the applications sharing the resources, and the maximum importance degree of the applications sharing the I/O peak time zone.

Figure 16:
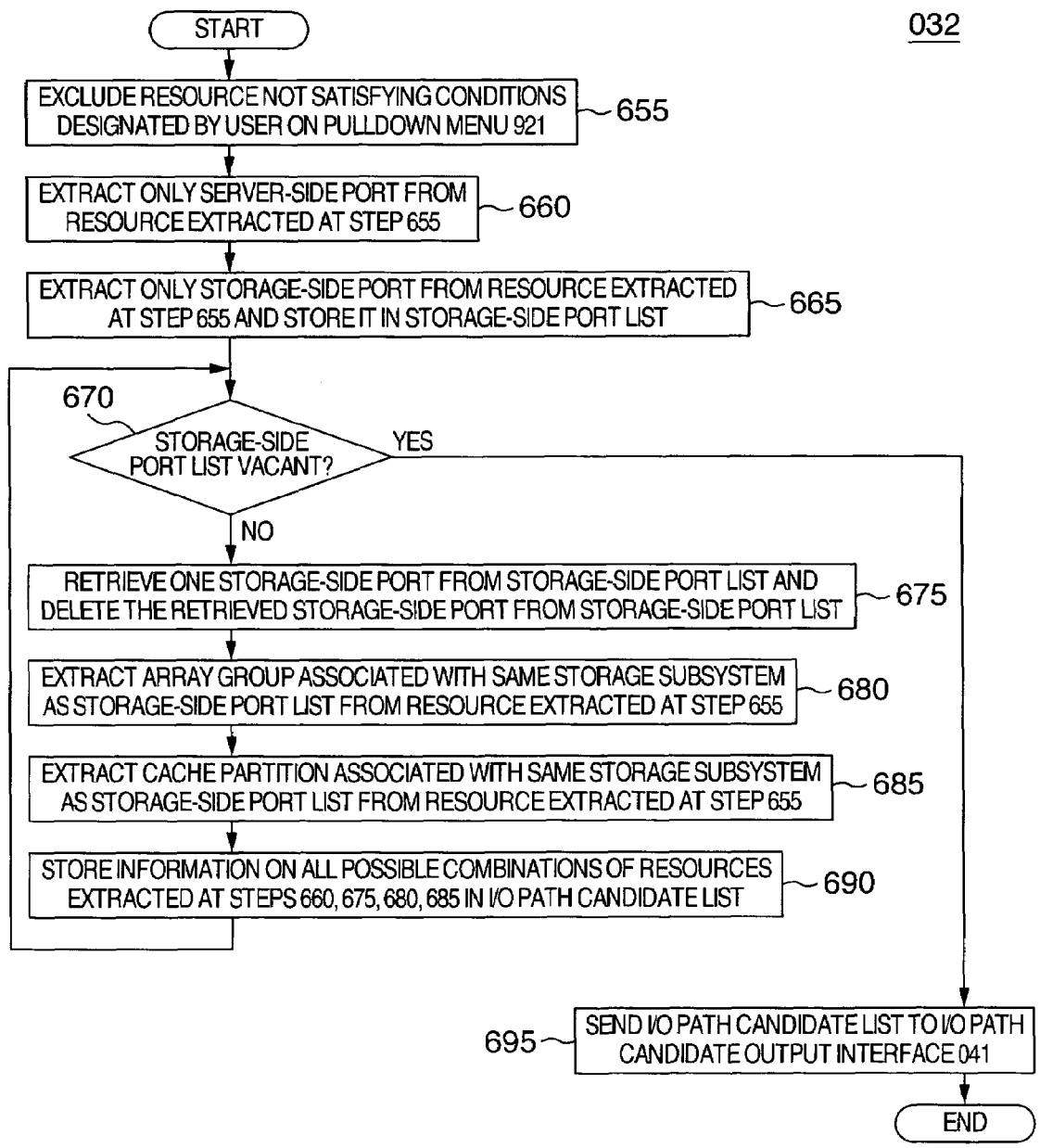
FIG. 16 is a diagram showing an example of the processing of an I/O path candidate information creation unit.

FIG. 16 is a diagram showing an example of the process executed by the I/O path candidate information creation unit 032. The process proceeds to the steps described below on the assumption that the I/O path candidate information creation unit 032 has received the conditions (for example, the average transfer rate of the server-side ports) designated by the pull-down menu 921 of the input view 920 shown in FIG. 19.

At Step 655, from the resource candidate information 086 (FIG. 15), the resources that fail to satisfy the conditions designated by the user in the pulldown menu 921 (FIG. 19) using the mouse 093 are removed (out of the I/O path candidates).

In the case where the condition designated by the pulldown menu 921 is the "average transfer rate of the storage-side ports", for example, the rows of the storage-side ports 302 failing to satisfy the condition are removed from the resource candidate information 086 (FIG. 15). More specifically, in the case where the condition "average transfer rate of the storage-side ports" is selected by the pulldown menu 921, the rows having the average performance value not more than the value (threshold value of the average transfer rate of the storage-side ports) input to the input column 927 of the input view 920 (FIG. 19) in the resource type of "the storage-side ports" and all the rows having the resource types other than the "storage-side ports" are extracted from the resource candidate information 086 (FIG. 15), and the process proceeds to Step 660. In the case where the condition designated by the pulldown menu 921 is "the average transfer rate of the server-side ports", on the other hand, only the rows having the average performance value not more than the value (the threshold value of the average transfer rate of the server-side ports) input to the input column 927 of the input view 920 (FIG. 19) in the resource type 871 of "the server-side ports" and all the rows having the resource types other than "the server-side ports" are extracted from the resource candidate information 086 (FIG. 15), and the process proceeds to Step 660.

In the case where the condition designated by the pulldown menu 921 is "the average response time of the array groups", for example, the rows having the average performance value not more than the value (the threshold value of the average response time of the array groups) input to the input column 927 of the input view 920 (FIG. 19) in the resource type 871 of "the array groups" and all the rows having the resource types other than "the array groups" are extracted from the resource candidate information 086 (FIG. 15), and the process proceeds to Step 660. In the case where the condition designated by the pulldown menu 921 is "the hit ratio of the cache partitions", on the other hand, the rows having the average performance value not less than the value (the threshold value of the average hit ratio of the cache partitions) input to the input column 927 of the input view 920 (FIG. 19) in the resource type 871 of "the cache partitions" and all the rows having the resource types other than "the cache partitions" are extracted from the resource candidate information 086 (FIG. 15), and the process proceeds to Step 660.

In the case where the condition designated by the pulldown menu 921 is "the maximum importance degree of the application using the resources", for example, only the rows having the importance degree not more than the maximum importance degree of the resources (the server-side ports, etc. for example) input to the input column 927 of the input view 920 (FIG. 19) are extracted from the resource candidate information 086 (FIG. 15), and the process proceeds to Step 660. In the case where the condition designated by the pulldown menu 921 is "the maximum importance degree of the applications sharing the I/O peak time zone", on the other hand, only the rows having the importance degree (the importance degree of the applications sharing the I/O peak time zone) not more than the maximum importance degree of the applications sharing the I/O peak time zone input to the input column 927 of the input view 920 (FIG. 19) are extracted from the resource candidate information 086 (FIG. 15), and the process proceeds to Step 660.

Further, in the case where the condition designated by the pulldown menu 921 is "not selected", all the rows of the resource candidate information 086 are extracted and the process proceeds to Step 660.

Step 655 shown in FIG. 16 has been explained with reference to a case in which one condition is designated by the pulldown menu 921. Nevertheless, a plurality of different conditions can be designated in combination. In this case, for each condition designated by the pulldown menu 921, the process of Step 655 and subsequent steps shown in FIG. 16 are executed continuously with regard to the rows of the resource candidate information 086 (FIG. 15). As far as the process of the steps using the second and subsequent conditions is concerned, however, the process of Step 655 and subsequent steps can be executed for the rows of the resource candidate information 086 extracted by the process of the steps using the preceding conditions.

At Step 660, only the resources of "the server-side ports" are extracted from the resources (the resources not excluded) extracted at Step 655. Specifically, from the rows making up the resource candidate information 086 (FIG. 15), only the rows containing the resource type "the server-side ports" are extracted, and the process proceeds to Step 665.

At Step 665, from the resources (the resources not excluded) extracted at Step 655, only the resources of "the storage-side ports" are extracted, and the rows extracted are stored in the storage-side port list (the table having the same items as the items 871 to 877 in FIG. 15) newly created. Specifically, from the rows making up the resource candidate information 086 (FIG. 15), only the rows containing the resource type 871 of "the storage-side ports" are extracted, and the process proceeds to Step 670.

Step 670 checks whether the storage-side port list created at Step 665 is vacant or not (the number of rows is zero or not), and if vacant (YES at Step 670), the process proceeds to Step 695, while if not vacant (NO at Step 670), the process proceeds to Step 675.

At Step 675, from the storage-side port list stored at Step 665, one value of the storage-side ports 302 is retrieved, and deleted from the storage-side port list.

At Step 680, the array group 301 associated with the same storage subsystem 300 as the storage-side port list is extracted from the resources extracted at Step 655. Specifically, from the resources (the rows including the resources) extracted at Step 655, the rows containing the server/storage subsystem name 872 coincident with the server/storage subsystem name of the storage-side port list in the resource type of "the array groups" are extracted.

At Step 685, the cache partition 303 associated with the same storage subsystem as the storage-side port list is extracted from the resources extracted at Step 655. Specifically, from the resources (the rows including the resources) extracted at Step 655, the rows containing the server/storage subsystem name 872 coincident with the server/storage subsystem name of the storage-side port list in the resource type of "the cache partitions" are extracted.

At Step 690, the information representing all possible combinations of the resources extracted at Steps 660, 675, 680, 685 are stored in the I/O path candidate list. Specifically, the process described below is executed for all the possible combinations configured by retrieving one row each from the rows extracted at Step 660, the rows deleted at Step 675 and extracted at Step 680 and the rows extracted at Step 685.

First, the resource name 873 and the average performance value 874 on the rows extracted at Step 660 are stored in the server-side port name and the server-side port average transfer rate, respectively, of the I/O path candidate list. Next, each value of the server/storage subsystem name 872, the resource name 873 and the average performance value 874 on the rows retrieved at Step 675 is stored in the storage subsystem name, the storage-side port name and the storage-side port average transfer rate, respectively, of the I/O path candidate list.

Next, each value of the resource name 873 and the average performance value 874 on the rows extracted at Step 680 are stored in the array group name and the array group average response time of the I/O path candidate list.

Then, each value of the resource name 873 and the average performance value 874 on the rows extracted at Step 685 are stored in the cache partition name and the cache partition average hit ratio, respectively, of the I/O path candidate list.

Finally, with regard to the rows extracted at Step 660, the rows extracted at Step 675 and the rows extracted at Step 685, the maximum value of the maximum importance degree 875 of the applications using the resources and the maximum value of the maximum importance degree 876 of the applications sharing the I/O peak time zone are determined. The two maximum values thus determined are stored in the maximum importance degree of the applications sharing the resources of the I/O path candidate list and the maximum importance degree of the applications sharing the I/O peak time zone, respectively. This process is executed for all the combinations described above (the rows extracted at Steps 660, 675, 680, 685), and then the process returns to Step 670.

At Step 695, the contents of the I/O path candidate list (the information making up the display screen view shown in FIG. 20) are sent to the output interface 041. Now, the process executed by the I/O path candidate information creation unit 032 is over.

The outer interface 041 that has received the I/O path candidate list displays the display screen view indicating the particular I/O path candidate list on the display unit 091. As a result, the display unit 091 displays the I/O path candidate between the application server 100 and the storage subsystem 300.

The display screen view 940 indicating the I/O path candidate list is shown in FIG. 20.

As shown in FIG. 20, the display screen view 940 contains the path candidate number 946, the server-side port name 947, the server-side port average transfer rate 948, the storage subsystem name 949, the storage-side port name 950 and the storage-side port average transfer rate 951. Also, the display screen view 940 contains the array group name 952, the array group average response time 953, the cache partition name 954 and the cache partition average hit ratio 955. Further, the display screen view 940 includes the maximum importance degree 956 of the applications sharing the resources and the maximum importance degree 957 of the applications sharing the I/O peak time zone.

Through this display screen view 940, the user confirms the I/O path candidate between the application server 100 and the storage subsystem 300, for example, selects the optimum I/O path from the candidates and thus can introduce a new application to the application server 100. For example, the I/O path designated by the path candidate number "1" or the I/O path designated by the path candidate number "2" can be selected from the display screen view 940.

In addition, the I/O path candidate displayed on the display screen view 940 constitutes the I/O path satisfying the conditions designated from the pulldown menu 921 of the input view 920 shown in FIG. 19. Thus, only the I/O paths using the resources designated in advance can be listed as candidates, and the resources (such as the server-side ports 102) considered to have no satisfactory performance such as the transfer rate can be removed from the candidate list.

Assume that the user designates the condition "the maximum importance of the application using the resources" by the pulldown menu 921 of the input view 920 shown in FIG. 19 and inputs the threshold value thereof to the input column 927 of the input view 920. The display screen view 940 shown in FIG. 20 displays the I/O path candidate including the resources not used for the applications exceeding the maximum importance degree of the designated condition.

Figure 14:
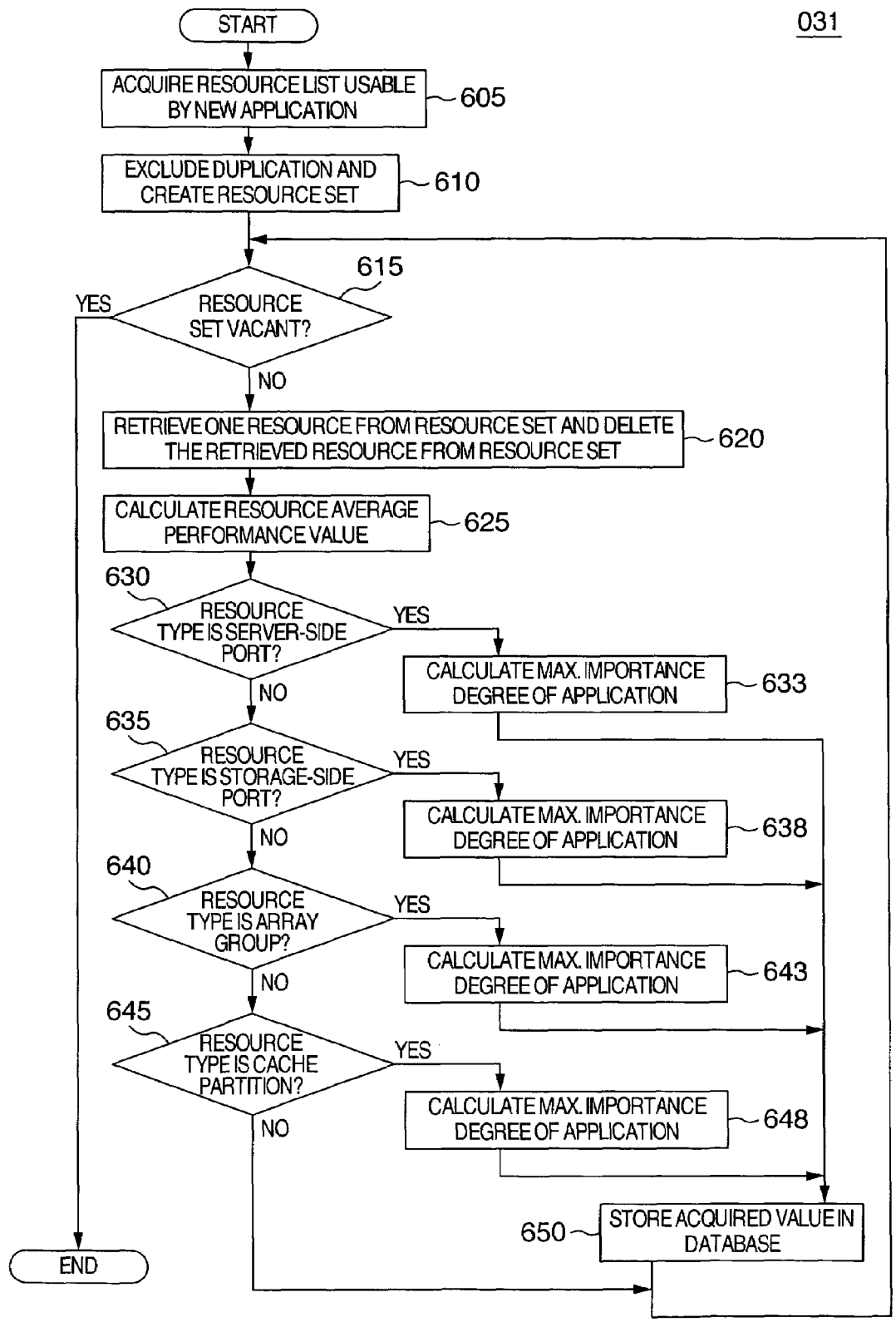
FIG. 14 is a diagram showing an example of the processing of a resource candidate information creation unit.

In this case, based on the importance degree 844 of the application information 070 (FIG. 13) managed by the memory 000B, the CPU 000A of the performance management server 000 extracts, from the resource list (I/O path) acquired at Step 605 shown in FIG. 14, the I/O path assigned the application having the importance degree satisfying the threshold of the condition designated on the input view 920 and outputs them externally to the display screen view 940. Even in the case where the user selects the I/O path from the candidates on display and assigns the resources to a new application, therefore, the applications exceeding the importance degree (threshold) of the designated application are not affected.

In the case where the user designates the condition "the maximum importance degree of the applications not sharing the I/O peak time zone" on the pulldown menu 921 of the input view 920 shown in FIG. 19 and inputs a value smaller than the importance degree of all the applications in the input column 927 of the input view 920, then the display screen view 940 shown in FIG. 20 displays the I/O path candidate including the resources used only by the existing application not sharing the I/O peak time zone with the new application.

In this case, the CPU 000A of the performance management server 000 extracts the I/O path satisfying the conditions (1) and (2) described below, from the resource list (I/O path) acquired at Step 605 shown in FIG. 14, and outputs them externally. Specifically, the CPU 000A extracts the I/O path (1) assigned the application program having the importance degree satisfying the threshold of the condition designated on the input view 920, based on the importance degree of the application information 070 (FIG. 13) managed by the memory 000B, and (2) assigned the application program having the I/O peak time zone not doubling with the I/O peak time zone of the conditions designated on the input view 920, based on the I/O peak time zone of the application information 070 (FIG. 13) managed in the memory 000B. As an alternative, the I/O path satisfying the condition (1) or (2) may be extracted in accordance with the conditions designated on the input view 920. Even in the case where the user assigns the resources to the new application using the I/O path in the candidates on display, therefore, the I/O collision in the I/O peak time zone shared by the new application and the existing application can be prevented.

As described above, according to this embodiment, assume that the CPU 000A of the performance management server 000 receives a request for newly assigning the application input through the input view 910 shown in FIG. 18, to a specified application server 100 by the operation of the keyboard 092 or the mouse 093. The I/O path between the requested application server 100 and the storage subsystem 300 combined with the application server 100 is acquired from the configuration information 090 (FIG. 2) of the memory 000B. Then, based on the performance information 060 (FIG. 2) of the memory 000B, the CPU 000A extracts, from the I/O paths thus acquired, the I/O path having the performance value satisfying the conditions designated through the input view 920 shown in FIG. 19. Then, the CPU 000A outputs. the I/O path candidate thus extracted externally to the display unit 091 through the display screen view 940 shown in FIG. 20. As a result, the optimum I/O path between the storage subsystem 300 and the application server 100 can be made available to the user. In this way, the assignment of a new application can be supported.

[Modifications]

This invention is not limited to the embodiments described above. The embodiments are described above with reference to a case in which one condition is designated on the input view 920 shown in FIG. 19. Nevertheless, in the case where a plurality of conditions can be designated, the display screen view 940 shown in FIG. 20 displays the I/O candidate described below.

For example, an I/O path candidate satisfies two conditions, i.e. a resource not used by the application exceeding a designated importance degree and a resource used only by the existing application not sharing the I/O peak time zone with a new application. Even in the case where the user assigns the resources to the new application using the I/O path cited as the candidate, the important application exceeding the designated importance degree is not affected while at the same time preventing the I/O collision during the I/O peak time zone shared by both the new application and the existing application.

In the case where the display screen view 940 shown in FIG. 20 is displayed on the display unit 091, the output interface 041 can display, by sorting in ascending or descending order, the values including the server-side port average transfer rate 948, for example, indicating the conditions designated by the pulldown menu 921 shown in FIG. 19. As a result, the user can easily select the appropriate I/O path from the I/O path candidates.

[Example of Detailed Display of I/O Path Candidates]

Figure 21:
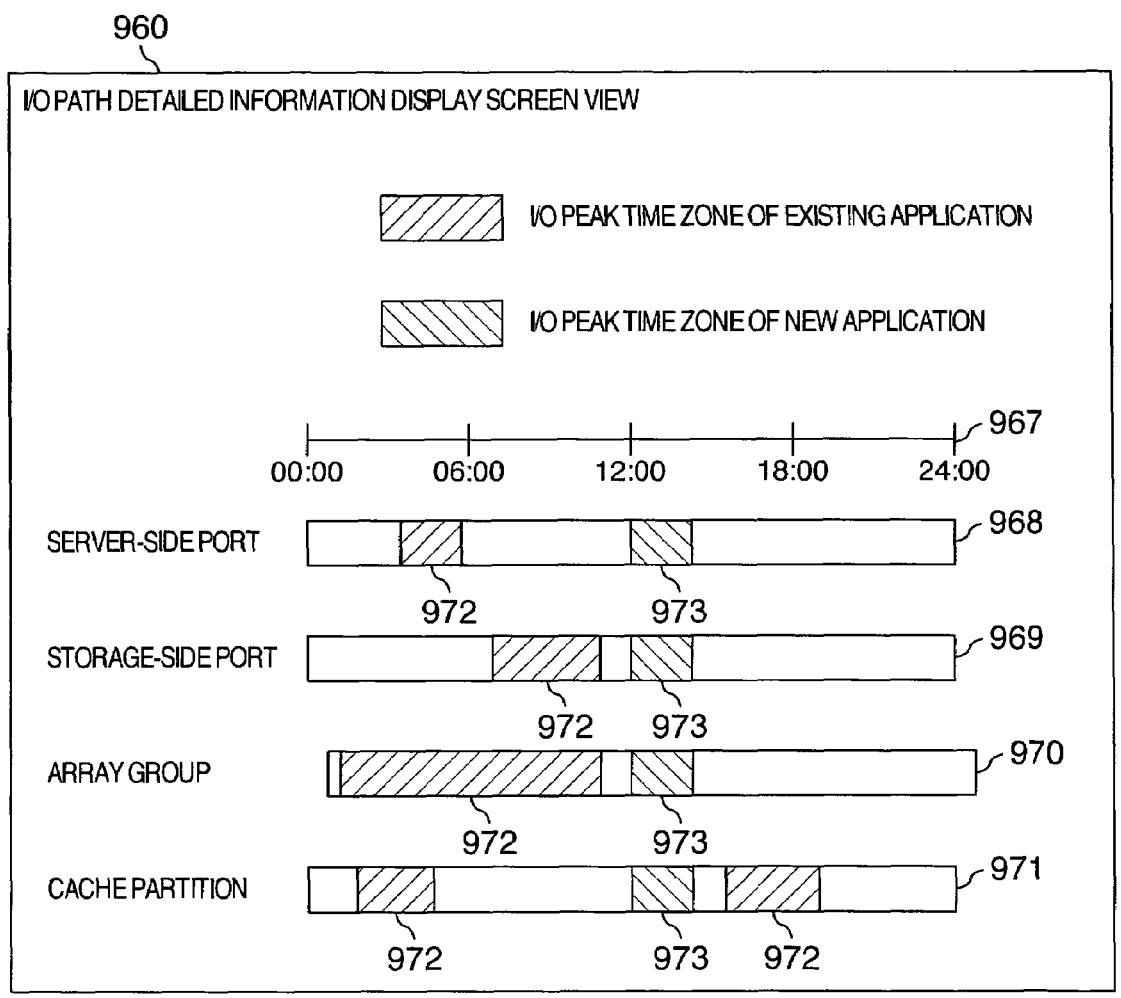
FIG. 21 is a diagram showing an example of display of an output view for the I/O path detailed information.

Further, the output interface 041, instead of displaying the I/O path candidate on the display unit 091 through the display screen view 940 shown in FIG. 20, may display the detailed information on the I/O path candidate on the display unit 091 through the display screen view 960 shown in FIG. 21.

The display screen view 960 shown in FIG. 21, unlike the display screen view 940 shown in FIG. 20, can display the I/O peak time zone of both the existing application and the new application. Specifically, the display screen view 960 shown in FIG. 21 displays the time axis 967 indicating 00:00 to 24:00. Using this time axis, both the I/O peak time zone 973 (also called "the rectangle 973" in FIG. 21) of the new application and the I/O peak time zone 972 (also called "the rectangle 972" in FIG. 21) of the existing application are displayed for the server-side ports 102, the storage-side ports 302, the array groups 301 and the cache partitions 303.

[Example of Process for Detailed Display of I/O Path Candidates]

Next, an example of the process executed by the output interface 041 and the I/O path candidate information creation unit 032 in the case where the display screen view 960 shown in FIG. 21 is displayed on the display unit 091 by the output interface 041 (See FIG. 2 as required).

In this case, the user designates one I/O path in the display screen view 940 shown in FIG. 20 using the mouse 093 (by clicking the path candidate number with the mouse 093, for example). In accordance with the designation, the output interface 041 makes an inquiry to the I/O path candidate information creation unit 032 about the detailed information on the particular I/O path. In response to this inquiry, the I/O path candidate information creation unit 032 acquires the detailed information of the particular I/O path (the I/O peak time zone of the existing application and the I/O peak time zone of the new application) based on the basic information 080 (the application information 070, the configuration information 090 and the performance information 060) and sends them to the output interface 041. The output interface 041 then displays the detailed information on the particular I/O path on the display screen view 960.

Specifically, in the case where the path candidate number is selected by the user operation on the display screen view 940 shown in FIG. 20, the output interface 041 sends the values of the server-side port name, the storage subsystem name, the storage-side port name, the array group name and the cache partition name designated by the selected path candidate number are sent to the I/O path candidate information creation unit 032.

The I/O path candidate information creation unit 032 acquires the values of the server-side port name, the storage subsystem name, the storage-side port name, the array group name and the cache partition name from the output interface 041. Then, the I/O path candidate information creation unit 032 extracts, from the configuration information 090 (FIG. 11), the row coinciding with the value (server name) of the input column 911 on the input view 910 shown in FIG. 18 and the value of the server port name 803 acquired from the output interface 041.

Next, the I/O path candidate information creation unit 032 acquires the combination of the values of the server name 801 and the file system name 802 indicated on the row of the extracted configuration information 090 (FIG. 11).

Next, the I/O path candidate information creation unit 032 extracts, from the application information 070 (FIG. 11), the row of the application information 070 (the row having the values of the server name 841 and the file system name 842) including the combination of the various values of the acquired server name 801 and the file system name 802. The I/O path candidate information creation unit 032 sends the values of the I/O peak time zone 845 (FIG. 13) indicated on all the rows extracted to the output interface 041.

The output interface 041, based on the values of the particular I/O peak time zone 845, displays the application display column 968 (of the server-side ports 102) of the display screen view 960 (FIG. 21) in the form of a rectangle 972.

Next, the I/O path candidate information creation unit 032 extracts, from the configuration information 090 (FIG. 11), the row containing the sets of the values of the storage subsystem name and the storage-side port name 805 acquired from the output interface 041 (the row having the combination of the values of the storage subsystem name 804 and the storage-side port name 805). Then, the I/O path candidate information creation unit 032 acquires the combination of the values of the server name 801 and the file system name 802 indicated on the row of the extracted configuration information 090 (FIG. 11).

Next, the I/O path candidate information creation unit 032 extracts, from the application information 070 (FIG. 13), the row (having the combination of the values of the server name 841 and the file system name 842) of the application information 070 including the combination of the values of the acquired server name 801 and the file system name 802. The I/O path candidate information creation unit 032 then sends the values of the I/O peak time zone 845 indicated on all the extracted rows to the output interface 041.

The output interface 041, based on the value of the I/O peak time zone 845, displays a rectangle 972 in the application display column 969 (that of the storage-side ports 302) of the display screen view 960 (FIG. 21).

Next, the I/O path candidate information creation unit 032 extracts, from the configuration information 090 (FIG. 11), the row containing the sets of the storage subsystem name and the array group name acquired from the output interface 041 (the row having the combination of the values of the storage subsystem name 804 and the array group name 806). Then, the I/O path candidate information creation unit 032 acquires the combination of the values of the server name 801 and the file system name 802 indicated on the row of the extracted configuration information 090 (FIG. 11).

Next, the I/O path candidate information creation unit 032 extracts, from the application information 070 (FIG. 13), the row (having the combination of the values of the server name 841 and the file system name 842) of the application information 070 including the combination of the values of the acquired server name 801 and the file system name 802. The I/O path candidate information creation unit 032 then sends the values of the I/O peak time zone 845 indicated on all the extracted rows to the output interface 041.

The output interface 041, based on the value of the I/O peak time zone 845, displays a rectangle 972 in the application display column 970 (that of the array group 301) of the display screen view 960 (FIG. 21).

Next, the I/O path candidate information creation unit 032 extracts, from the configuration information 090 (FIG. 11), the row containing the sets of the values of the storage subsystem name and the cache partition name acquired from the output interface 041 (the row having the combination of the values of the storage subsystem name 804 and the cache partition name 807). Then, the I/O path candidate information creation unit 032 acquires the combination of the values of the server name 801 and the file system name 802 indicated on the row of the extracted configuration information 090 (FIG. 11).

Next, the I/O path candidate information creation unit 032 extracts, from the application information 070 (FIG. 13), the row (having the combination of the values of the server name 841 and the file system name 842) of the application information 070 including the combination of the values of the acquired server name 801 and the file system name 802. The I/O path candidate information creation unit 032 then sends the values of the I/O peak time zone 845 indicated on all the extracted rows to the output interface 041.

The output interface 041, based on the value of the I/O peak time zone 845, displays a rectangle 972 in the application display column 971 (that of the cache partitions 303) of the display screen view 960 (FIG. 21).

Finally, the output interface 041, based on the input value (time zone) of the input columns 912, 913 of the I/O peak time zone of the input view 910 (FIG. 18), displays a rectangle 973 in the application display columns 968 to 971 of the server-side ports, the storage-side ports, the array groups and the cache partitions of the display screen view 960 (FIG. 21).

In this way, the CPU 000A of the performance management server 000 calculates the I/O peak time zone of the application from the various performance information 112, 212, 213, 214 (FIGS. 4 to 7) managed by the performance information 060 of the internal database 050 of the performance management server of the memory 000B. Also, the CPU 000A displays, through the display screen view 960 shown in FIG. 21, the detail (the I/O peak time zone of the existing application and the I/O peak time zone of the new application) of the I/O path candidate selected by the user. As a result, the user can predict the effect (the effect of the new application on the other existing applications in the case where the I/O process is increased during other than the I/O peak time zone) of the operation of the new application by the application server 100 on the other existing applications.

This embodiment has been explained with reference to a case in which the I/O peak time zone of the existing application is displayed on the display screen view 960 shown in FIG. 1. As an alternative, the application name and the importance degree of the existing application can also be displayed on the display screen view 960.

Also, unlike in this embodiment in which the performance management server 000 acquires the I/O peak time zone of the existing application on the input view 900 shown in FIG. 17, the I/O peak time zone of the existing application can alternatively be acquired from the performance value of each resource.

Specifically, the threshold of the performance value for each resource used by the existing application is acquired on the input view 900 (FIG. 17) displayed by the input interface 044 shown in FIG. 2.

The resource candidate information creation unit 031 determines, based on the threshold value, using the performance information 060 for each time zone, whether the performance value of each resource used by the existing application has reached the I/O peak. The time zone in which at least one resource exceeds the threshold value is regarded as the I/O peak time zone of the same existing application. The performance value used for this determination is the value (period) input to the input column 916 of the input view 910 (FIG. 18) as an average value of the performance value determined for each time zone.

By doing so, the I/O peak time zone of each application can be determined automatically based on the threshold value designated by the user, and in accordance with the I/O peak time zone thus determined, the I/O path candidate including the resources used only by the existing application not sharing the I/O peak time zone with the new application can be displayed. As a result, even in the case where the I/O amount issued by the application is subjected to a protracted variation, an always appropriate I/O path candidate can be displayed.

Further, the performance management server 000 can carry out the distributed process by combining a plurality of computers unlike in the aforementioned case where only one computer is used.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A storage management system comprising at least an application server to which an application program is assigned; at least a storage subsystem having a storage area used for the application program; and a management server for extracting an I/O path from a plurality of candidate I/O paths between the application server and the storage subsystem, wherein the management server includes a storage unit and a processing unit, wherein the storage unit of the management server manages a combination of I/O paths between the application server and the storage subsystem, and various performance values on component elements of the I/O paths, wherein the processing unit of the management server, upon receipt of a request from an external device to newly assign an application program to a specified application server, acquires the plurality of candidate I/O paths between the requested application server and the storage subsystem combined with the application server from the combination of the I/O paths managed by the storage unit, wherein an I/O path having a performance value satisfying conditions from the external device is extracted from the acquired plurality of candidate I/O paths based on the various performance values managed by the storage unit, and wherein the extracted I/O path is output externally as a candidate path, wherein the plurality of candidate I/O paths is determined based on predetermined conditions including average transfer rate of server-side ports, average transfer rate of storage-side ports, average response time of array groups, average hit ratio of cache partitions, maximum importance degree of application sharing resources, and maximum importance degree of application sharing I/O peak time zones, and wherein candidate I/O paths satisfying these predetermined conditions are displayed for a user to extract an optimized I/O path from the plurality of candidate I/O paths with the optimized path being determined based on display information including path candidate numbers, server-side port names, server-side port average transfer rates, storage subsystem names, storage-side port names, storage-side port average transfer rates, array group names, array group average response times, cache partition names, cache partition average hit ratios, maximum importance degree of application sharing resources, and maximum importance degree of application sharing I/O peak time zones.

2. The storage management system according to claim 1, wherein the storage unit of the management server manages an importance degree of the application program assigned to the application program, wherein the processing unit of the management server, in a case where the conditions from the external device relate to a threshold value of the importance degree of the assigned application program, extracts, from the acquired plurality of candidate I/O paths, an I/O path assigned the application program having an importance degree satisfying the threshold value designated by the conditions from the external device, and outputs the extracted I/O path to an external device.

3. The storage management system according to claim 1, wherein the storage unit of the management server further manages an I/O peak time zone of the application program assigned to the application server, and wherein the processing unit of the management server is such that, in a case where the conditions from the external device relate to an I/O peak time zone of the application program requested for assignment, an I/O path assigned an application program having the I/O peak time zone not shared with the I/O peak time zone designated by the conditions from the external device is extracted from the acquired plurality of candidate I/O paths and output to the external device.

4. The storage management system according to claim 1, wherein the storage unit of the management server further manages an importance degree of the application program assigned to the application server and an I/O peak time zone of the application program assigned to the application server, wherein the processing unit of the management server is such that, in a case where the conditions from the external device relate to a threshold value of the importance degree of the assigned application program and the I/O peak time zone of the application program requested for assignment, an I/O path, which is assigned to the application program having the importance degree satisfying the threshold value designated by the conditions from the external device based on the importance degree managed by the storage unit and which is assigned to the application program having the I/O peak time zone not shared with the I/O peak time zone designated by the conditions from the external device based on the I/O peak time zone managed by the storage unit, is extracted from the acquired plurality of candidate I/O paths and output to the external device.

5. The storage management system according to claim 3, wherein the storage unit of the management server further manages the I/O peak time zone of the application program utilizing each component element making up the I/O path, and wherein the processing unit of the management server, in a case where a candidate for the I/O path extracted is output to the external device, reads the I/O peak time zone of the application program utilizing the component elements making up the I/O path from the storage unit, and together with the I/O peak time zone, outputs the I/O path candidate to the external device.

6. The storage management system according to claim 3, wherein the I/O peak time zone of the application program managed by the storage unit of the management server is calculated by the processing unit of the management server from the various performance values managed by the storage unit.

7. A storage management method executed by use of a computer system comprising at least an application server to which an application program is assigned, at least a storage subsystem having a storage area used for the application program and a management server for extracting an I/O path from a plurality of candidate I/O paths between the application server and the storage subsystem, wherein the management server includes a storage unit and a processing unit, wherein the storage unit of the management server manages a combination of I/O paths between the application server and the storage subsystem and various performance values on component elements of the I/O paths;
wherein the processing unit of the management server, upon receipt of a request from an external device to newly assign an application program to a specified application server, executes the method comprising the steps of:
acquiring a plurality of candidate I/O paths between the requested application server and the storage subsystem combined with the application server from the combination of the I/O paths managed by the storage unit;
extracting an I/O path having a performance value satisfying the conditions from the external device from the acquired plurality of acquired I/O paths based on the various performance values managed by the storage unit; and
outputting the extracted I/O path to an external device as a candidate path,
wherein the plurality of candidate I/O paths is determined based on predetermined conditions including average transfer rate of server-side ports, average transfer rate of storage-side ports, average response time of array groups, average hit ratio of cache partitions, maximum importance degree of application sharing resources, and maximum importance degree of application sharing I/O peak time zones, and wherein candidate I/O paths satisfying these predetermined conditions are displayed for a user to extract an optimized I/O path from the plurality of candidate I/O paths with the optimized path being determined based on display information including path candidate numbers, server-side port names, server-side port average transfer rates, storage subsystem names, storage-side port names, storage-side port average transfer rates, array group names, array group average response times, cache partition names, cache partition average hit ratios, maximum importance degree of application sharing resources, and maximum importance degree of application sharing I/O peak time zones.

8. The storage management method according to claim 7, wherein the storage unit of the management server manages an importance degree of the application program assigned to the application server,
wherein the processing unit of the management server, in a case where the conditions from the external device relate to a threshold value of the importance degree of the assigned application program, executes the method comprising the steps of:
extracting, from the acquired plurality of candidate I/O paths, an I/O path assigned to the application program having the importance degree satisfying the threshold value designated by the conditions from the external device; and
outputting the extracted I/O path to the external device.

9. The storage management method according to claim 7, wherein the storage unit of the management server further manages an I/O peak time zone of the application program assigned to the application server, and
wherein the processing unit of the management server, in a case where the conditions from the external device relate to the I/O peak time zone of the application program requested for assignment, executes the method comprising the steps of:
extracting an I/O path assigned an application program having the I/O peak time zone not shared with the I/O peak time zone designated by the conditions from the external device; and
outputting the extracted I/O path to the external device.

10. The storage management method according to claim 7, wherein the storage unit of the management server further manages an importance degree of the application program assigned to the application server and the I/O peak time zone of the application program assigned to the application server,
wherein the processing unit of the management server, in a case where the conditions from the external device relate to a threshold value of the importance degree of the assigned application program and the I/O peak time zone of the application program requested for assignment, executes the method comprising the steps of:
extracting an I/O path, which is assigned to the application program having the importance degree satisfying the threshold value designated by the conditions from the external device based on the importance degree managed by the storage unit and which is assigned to the application program having the I/O peak time zone not shared with the I/O peak time zone designated by the conditions from the external device based on the I/O peak time zone managed by the storage unit, from the acquired plurality of candidate I/O paths; and
outputting the extracted I/O path to the external device.

11. The storage management method according to claim 9, wherein the storage unit of the management server further manages the I/O peak time zone of the application program utilizing each component element making up the I/O path, and
wherein the processing unit of the management server, in a case where a candidate for the I/O path extracted is output to the external device, executes the method comprising the steps of:
reading the I/O peak time zone of the application program utilizing the component elements making up the I/O path from the storage unit, and
outputting, together with the I/O peak time zone, the I/O path candidate to the external device.

12. The storage management method according to claim 9, wherein the I/O peak time zone of the application program managed by the storage unit of the management server is calculated by the processing unit of the management server from the various performance values managed by the storage unit.

13. A storage management system comprising at least an application server to which an application program is assigned; at least a storage subsystem having a storage area used for the application program; and a management server for extracting an I/O path from a plurality of candidate I/O paths between the application server and the storage subsystem,
wherein the management server includes a storage unit and a processing unit,
wherein the storage unit of the management server manages a combination of I/O paths between the application server and the storage subsystem and various performance values on component elements of the I/O paths,
wherein the processing unit of the management server, upon receipt of a request from an external device to newly assign an application program to a specified application server, acquires the plurality of candidate I/O paths between the requested application server and the storage subsystem combined with the application server from the combination of the I/O paths managed by the storage unit,
wherein the storage unit of the management server manages an importance degree of the application program assigned to the application server and an I/O peak time zone of the application program assigned to the application server, and wherein the processing unit of the management server is such that, in a case where the conditions from the external device relate to a threshold value of the importance degree of the assigned application program and an I/O peak time zone of the application program requested for assignment, an I/O path, which is assigned to the application program having the importance degree satisfying the threshold value designated by the conditions from the external device based on the importance degree managed by the storage unit and which is assigned to the application program having the I/O peak time zone not shared with the I/O peak time zone designated by the conditions from the external device based on the I/O peak time zone managed by the storage unit, is extracted from the acquired plurality of candidate I/O paths and output to the external device, wherein the plurality of candidate I/O paths is determined based on predetermined conditions including average transfer rate of server-side ports, average transfer rate of storage-side ports, average response time of array groups, average hit ratio of cache partitions, maximum importance degree of application sharing resources, and maximum importance degree of application sharing I/O peak time zones, and wherein candidate I/O paths satisfying these predetermined conditions are displayed for a user to extract an optimized I/O path from the plurality of candidate I/O paths with the optimized path being determined based on display information including path candidate numbers, server-side port names, server-side port average transfer rates, storage subsystem names, storage-side port names, storage-side port average transfer rates, array group names, array group average response times, cache partition names, cache partition average hit ratios, maximum importance degree of application sharing resources, and maximum importance degree of application sharing I/O peak time zones.

* * * * *